Inventor
Gunnar Nelson
By
Karl Beust
His Attorney

Jan. 27, 1942.                G. NELSON                2,270,960
                          ACCOUNTING MACHINE
                        Filed Jan. 21, 1938          16 Sheets-Sheet 2
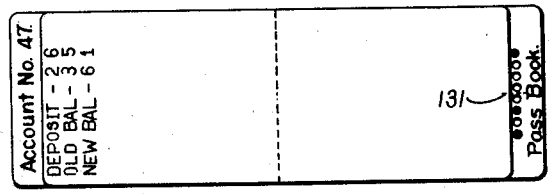
FIG. 4
FIG. 3
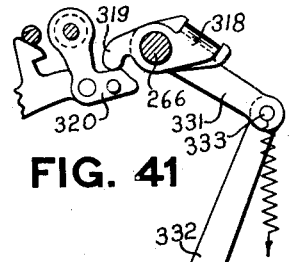
FIG. 41
FIG. 2
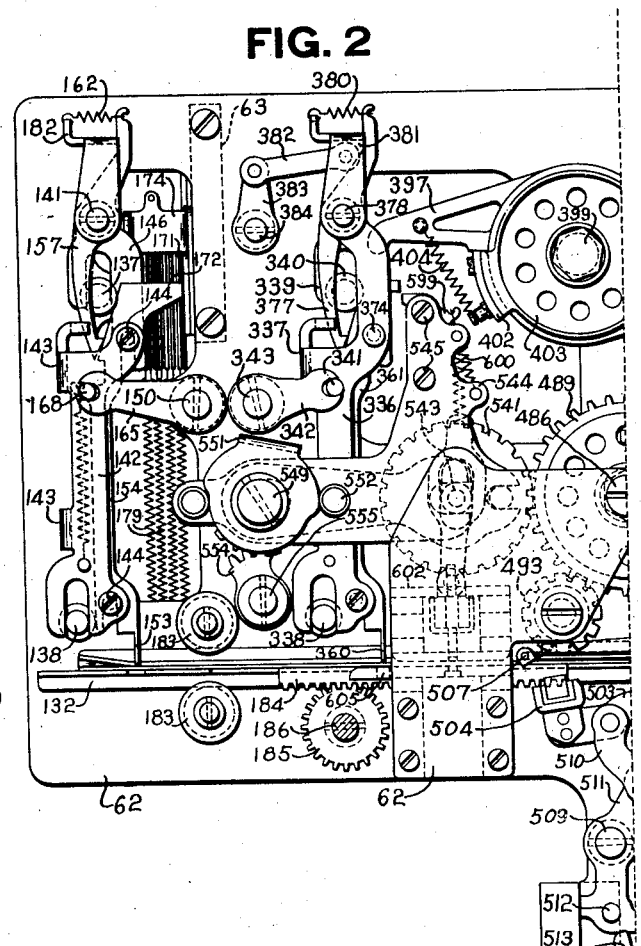
Inventor
Gunnar Nelson
By
Carl Benet
His Attorney

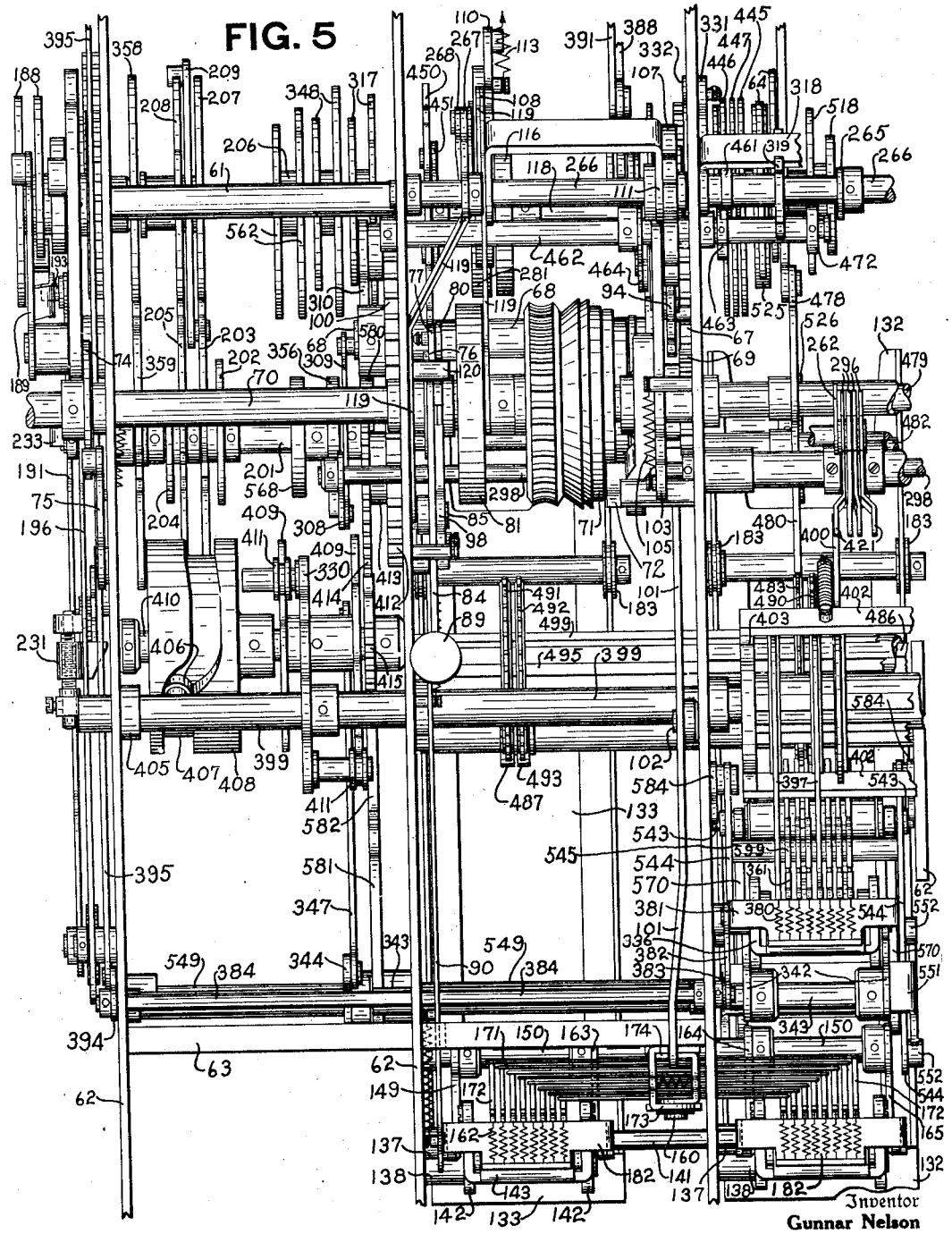

Jan. 27, 1942.                G. NELSON                 2,270,960
                         ACCOUNTING MACHINE
                        Filed Jan. 21, 1938            16 Sheets-Sheet 4
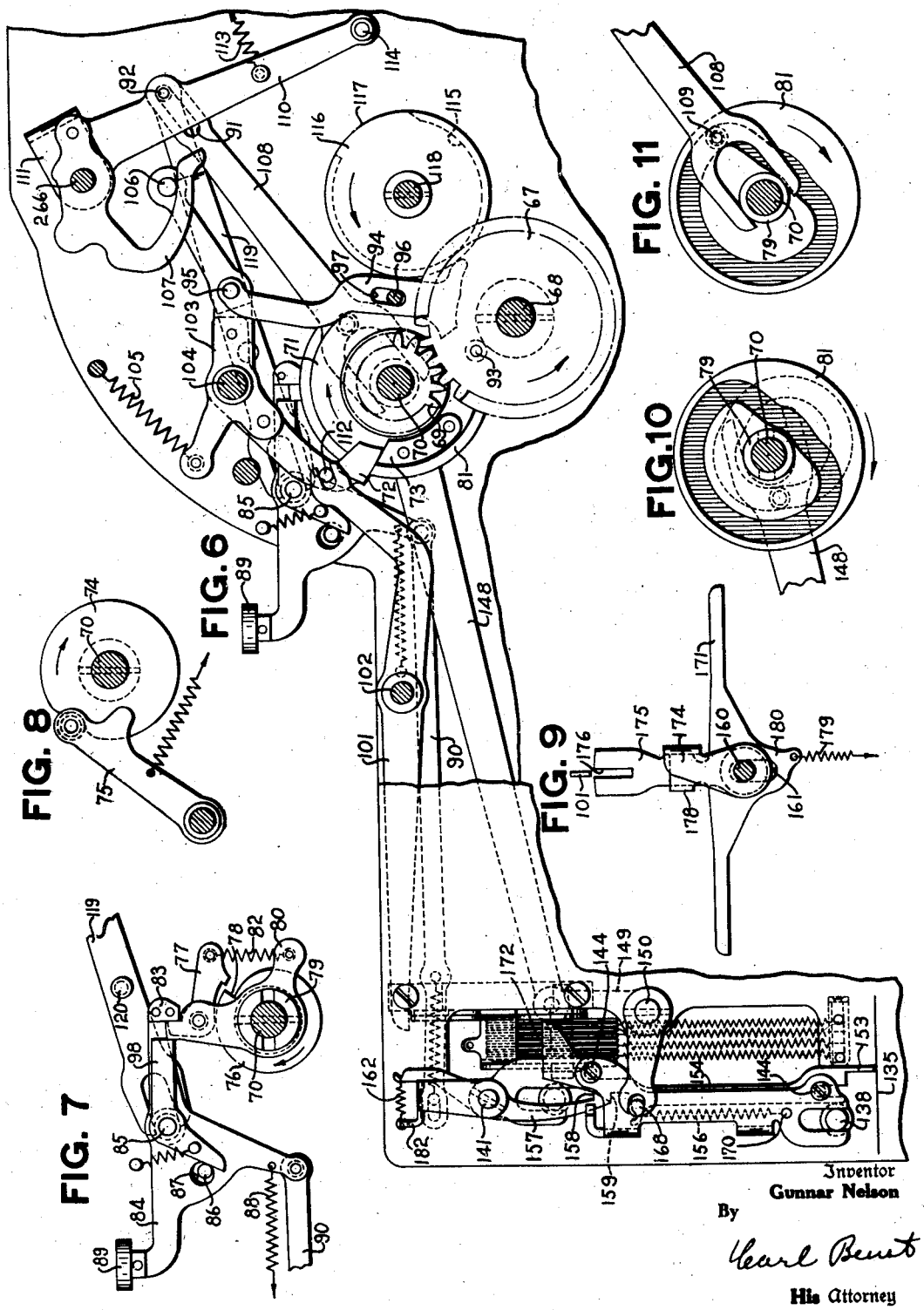
Inventor
Gunnar Nelson
By
Carl Benet
His Attorney Jan. 27, 1942.                G. NELSON                 2,270,960
                        ACCOUNTING MACHINE
                       Filed Jan. 21, 1938          16 Sheets-Sheet 5
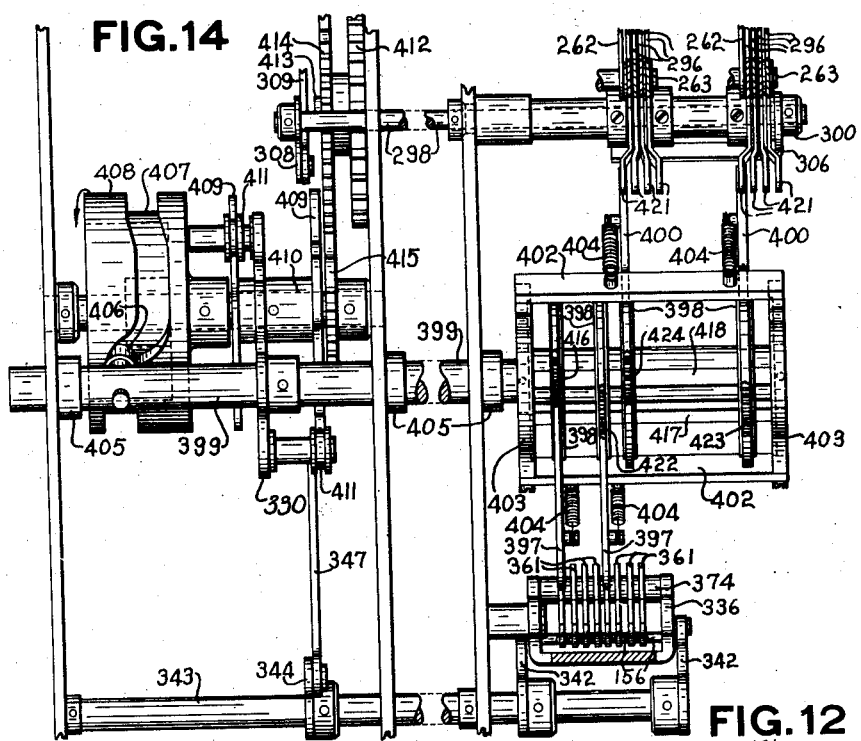
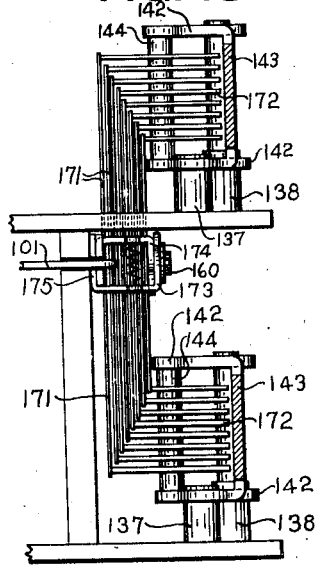
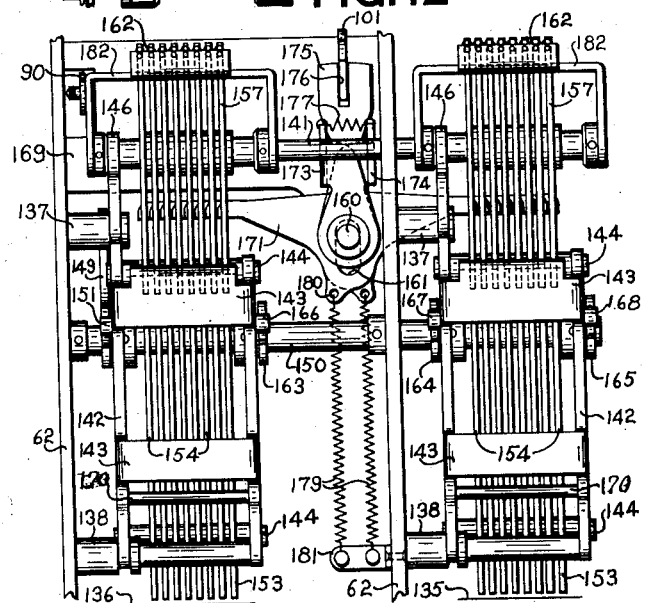
Inventor
Gunnar Nelson
By
Carl Beust
His Attorney Jan. 27, 1942.　　　G. NELSON　　　2,270,960
ACCOUNTING MACHINE
Filed Jan. 21, 1938　　　16 Sheets-Sheet 6
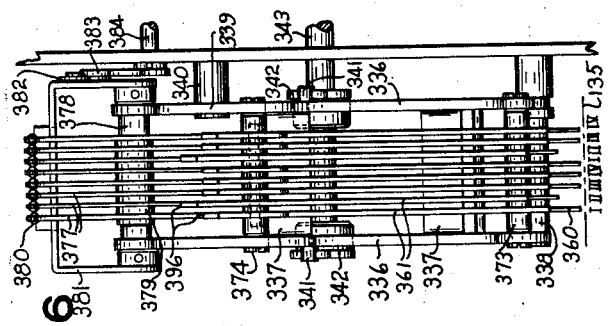
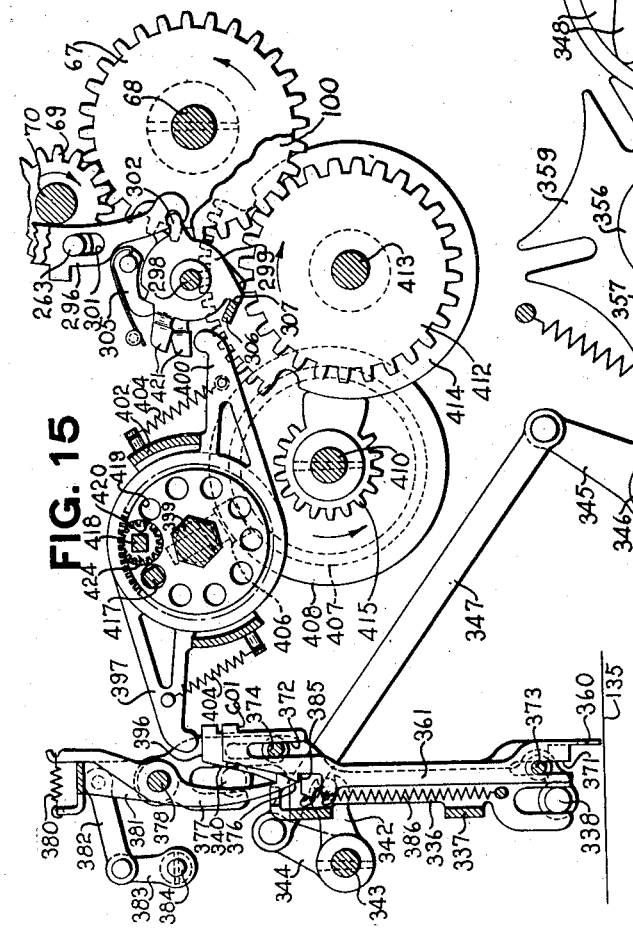
Inventor
Gunnar Nelson
By Carl Beust
His Attorney Jan. 27, 1942.          G. NELSON          2,270,960
ACCOUNTING MACHINE
Filed Jan. 21, 1938          16 Sheets-Sheet 7
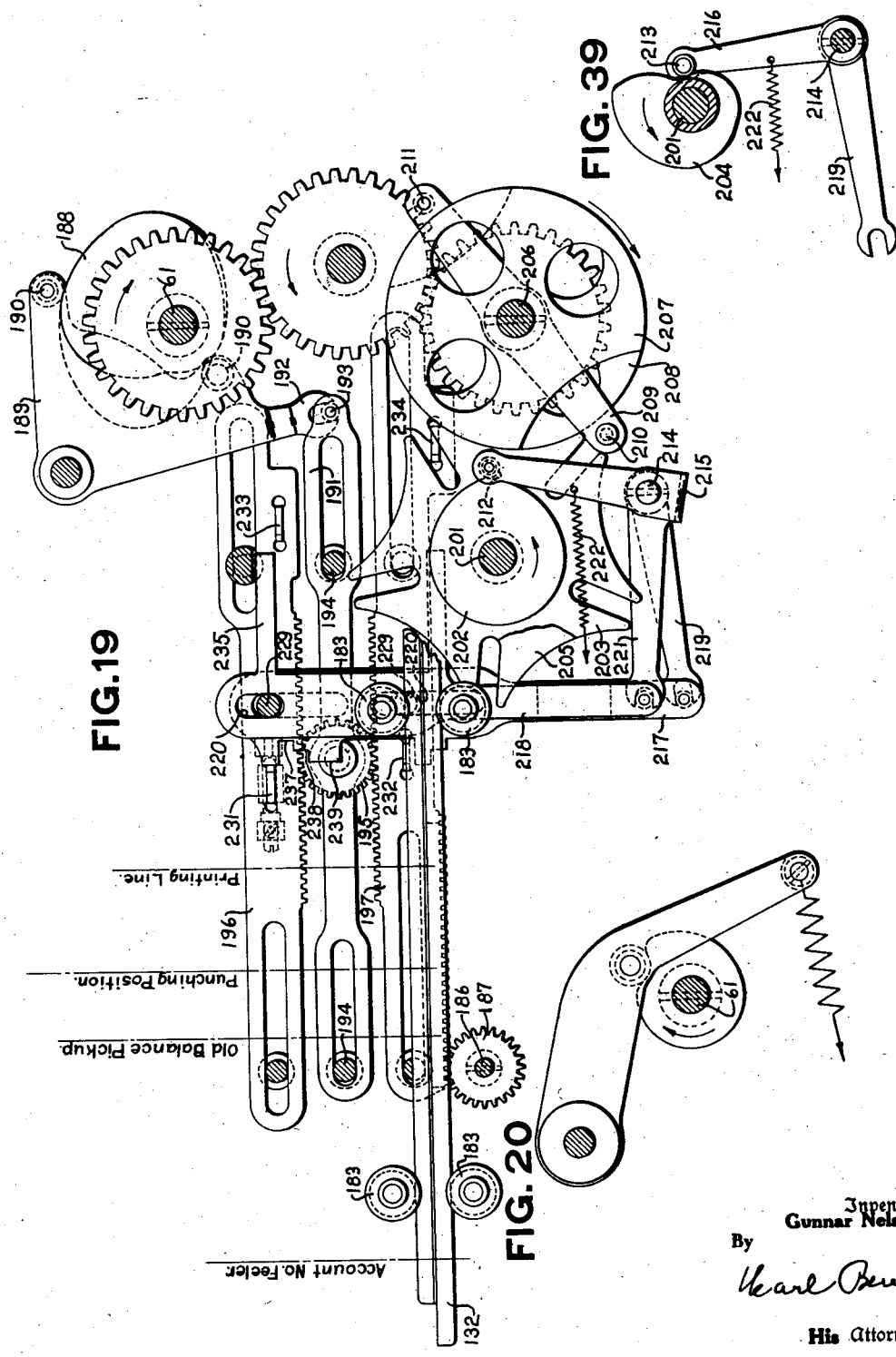
Inventor
Gunnar Nelson
By
Karl Benst
His Attorney Jan. 27, 1942.　　　　G. NELSON　　　　2,270,960
ACCOUNTING MACHINE
Filed Jan. 21, 1938　　　16 Sheets-Sheet 8
FIG. 21
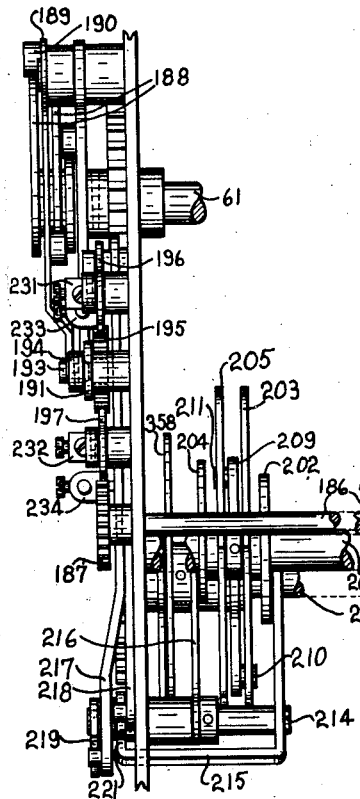
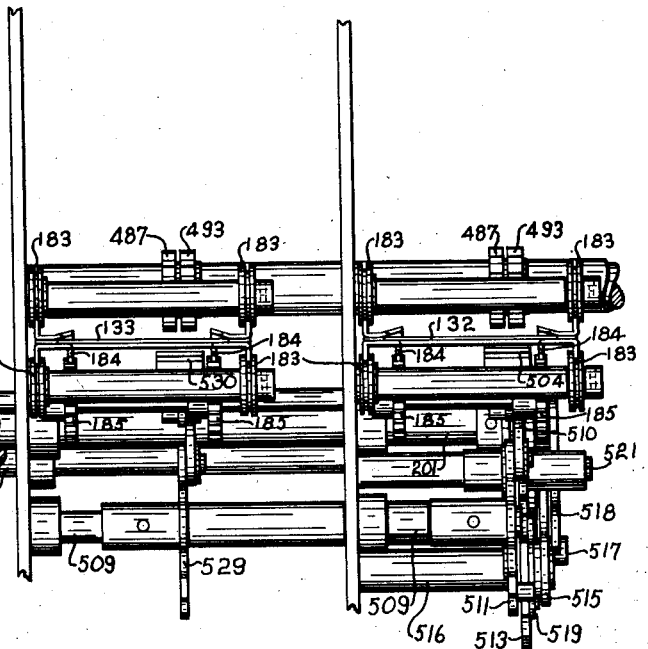
FIG. 22
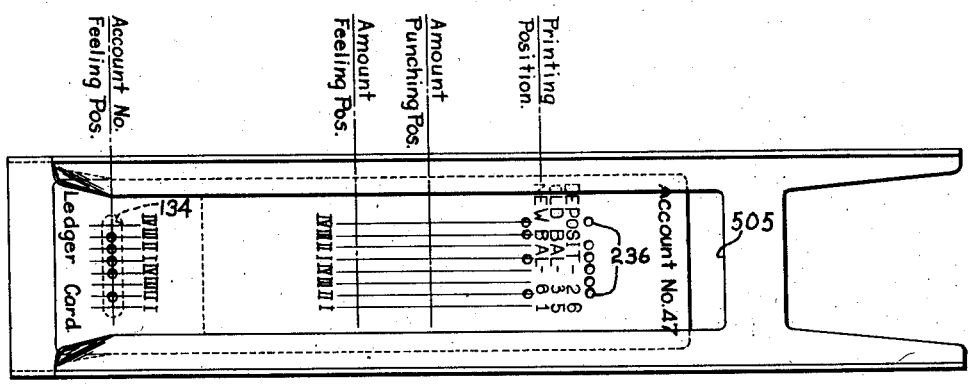
Inventor
Gunnar Nelson
By
Carl Benst
His Attorney Jan. 27, 1942.  G. NELSON  2,270,960
ACCOUNTING MACHINE
Filed Jan. 21, 1938  16 Sheets-Sheet 9
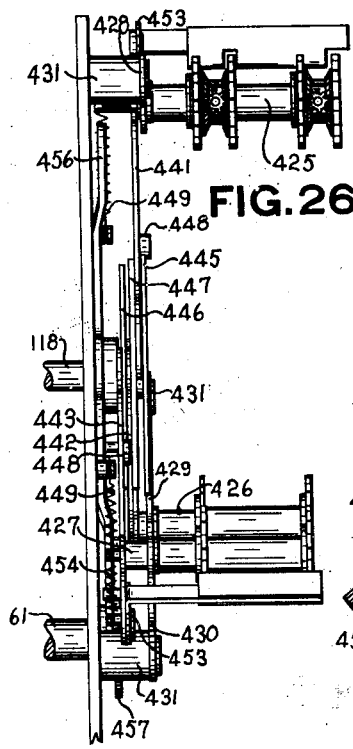
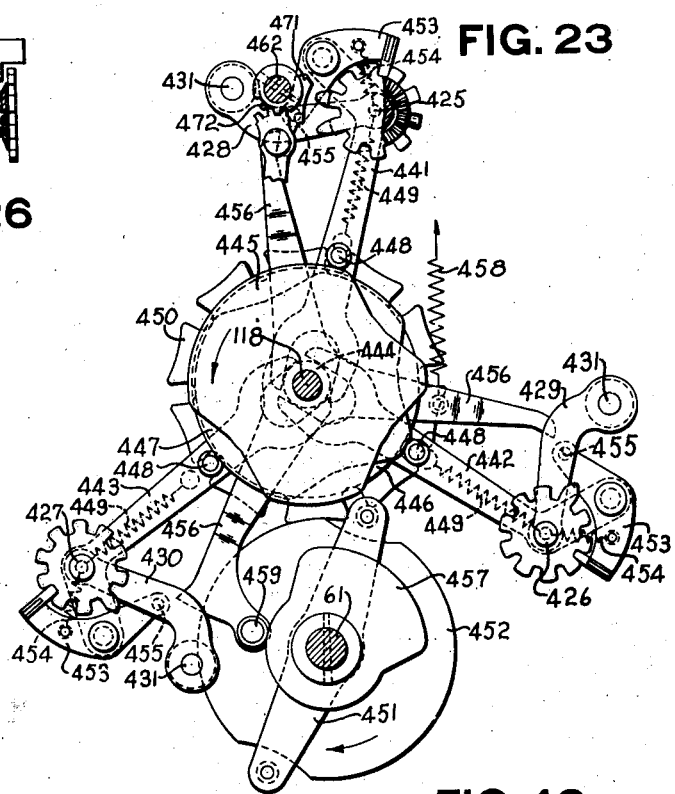
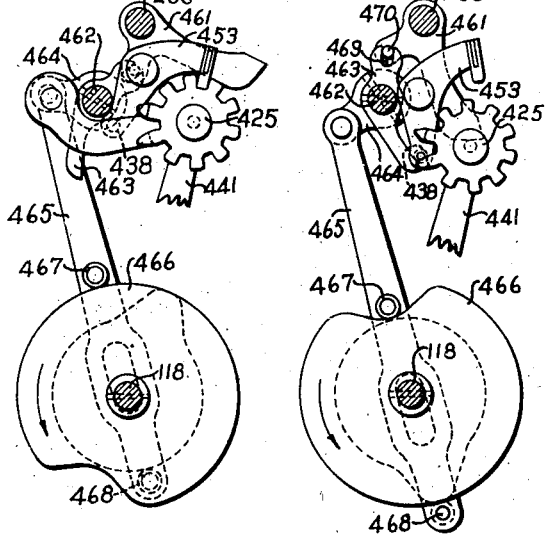
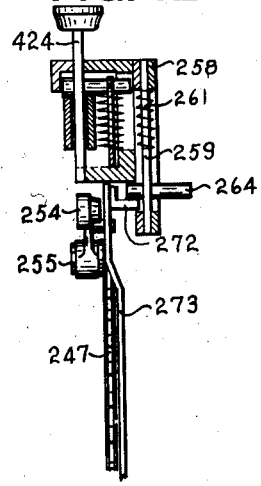
Inventor
Gunnar Nelson
By
Carl Benst
, His Attorney Jan. 27, 1942.          G. NELSON                    2,270,960
                     ACCOUNTING MACHINE
                   Filed Jan. 21, 1938            16 Sheets-Sheet 10
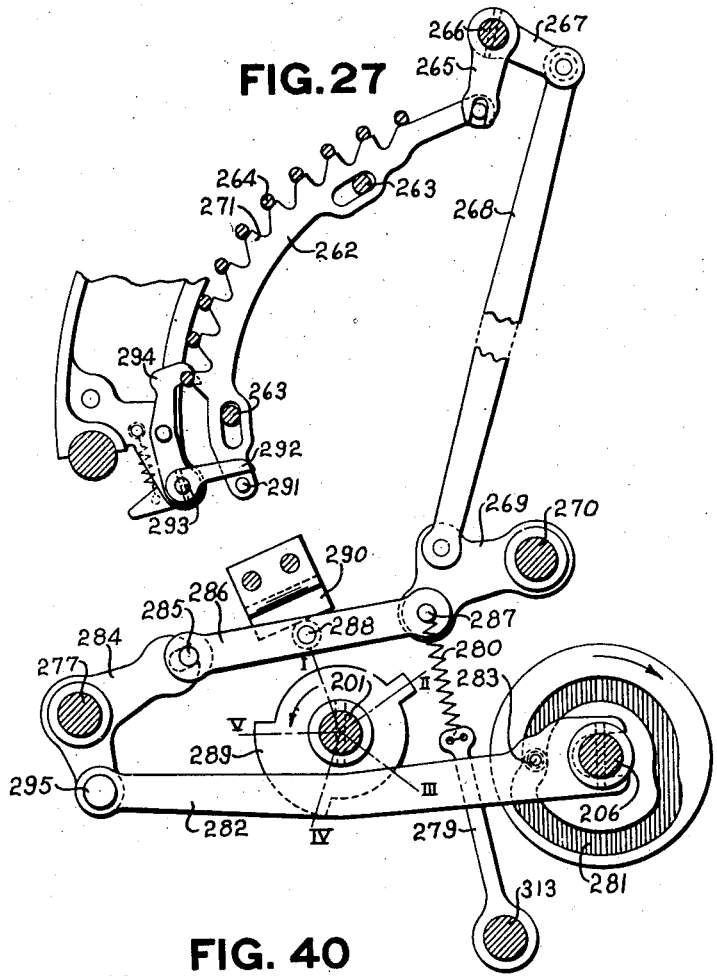
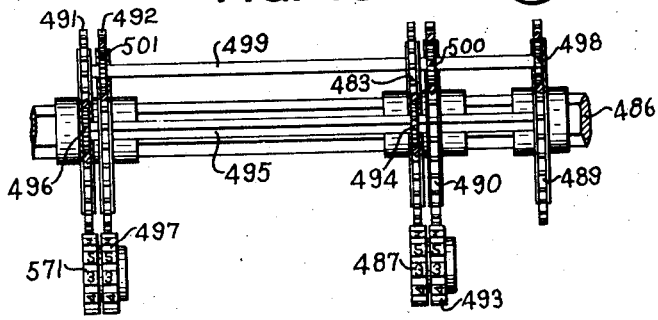
Inventor
Gunnar Nelson
By
Earl Benst
His Attorney.

Jan. 27, 1942.      G. NELSON      2,270,960
ACCOUNTING MACHINE
Filed Jan. 21, 1938      16 Sheets-Sheet 11
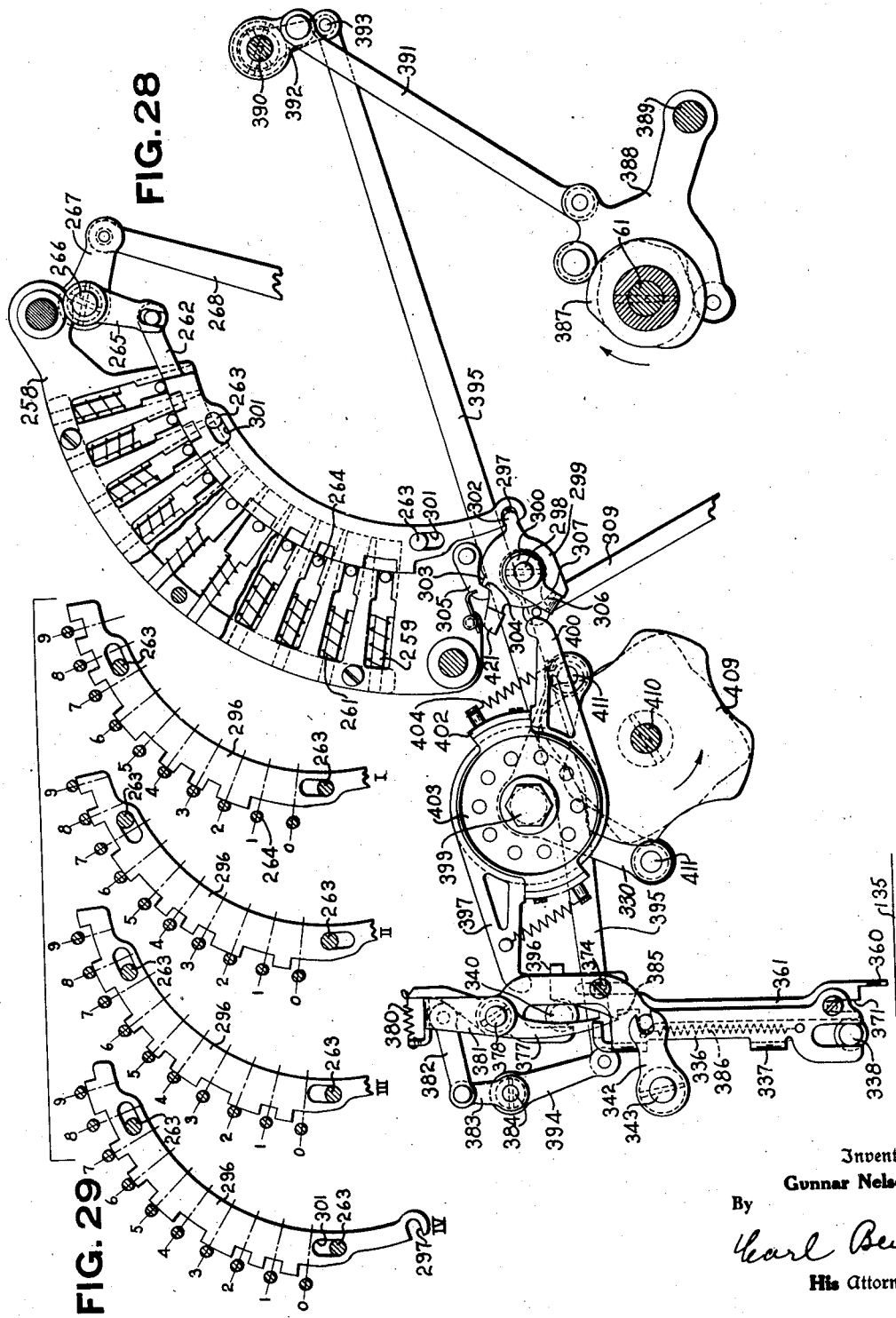
Inventor
Gunnar Nelson
By
Carl Benst
His Attorney

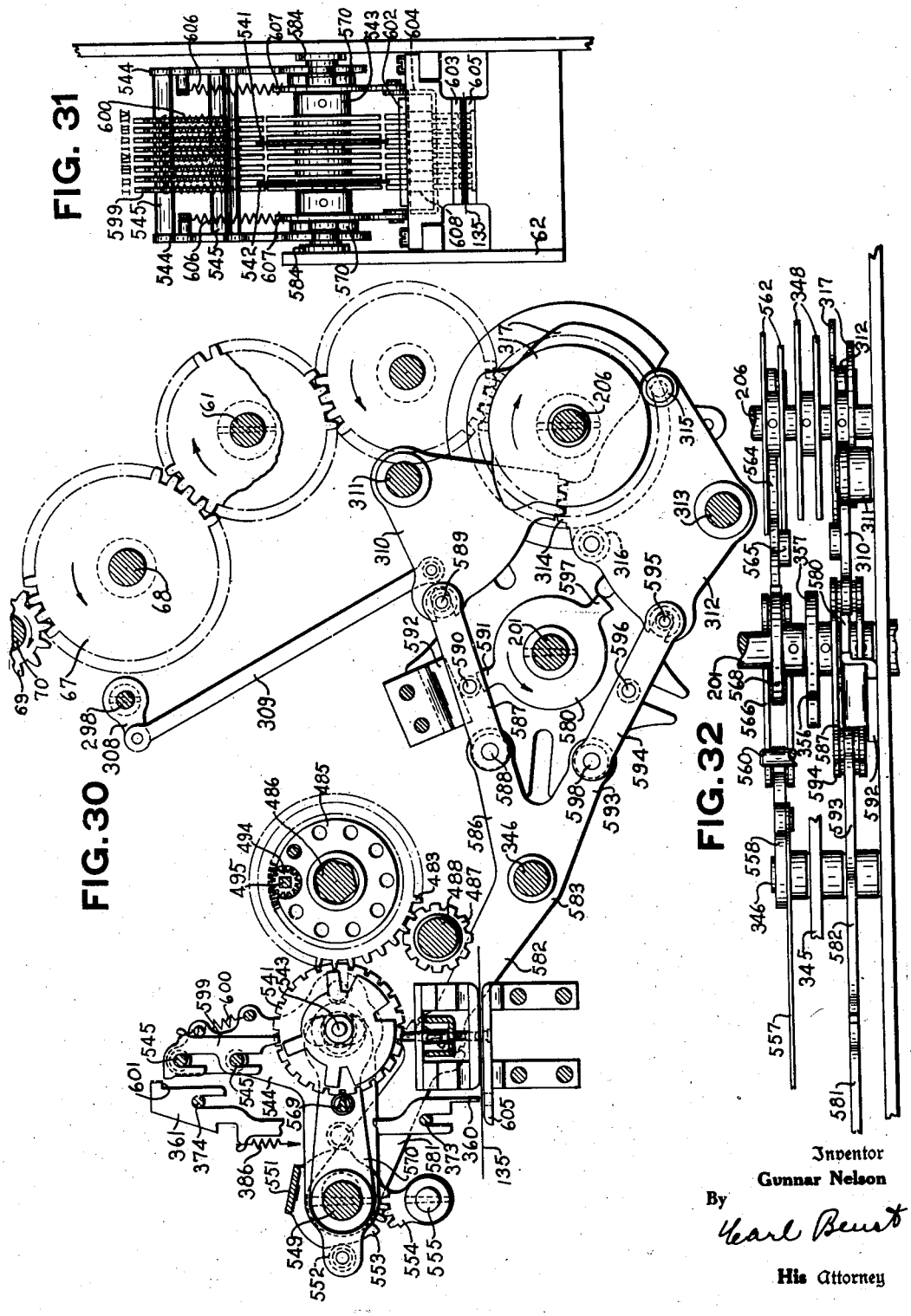

Jan. 27, 1942.   G. NELSON   2,270,960
ACCOUNTING MACHINE
Filed Jan. 21, 1938   16 Sheets-Sheet 13
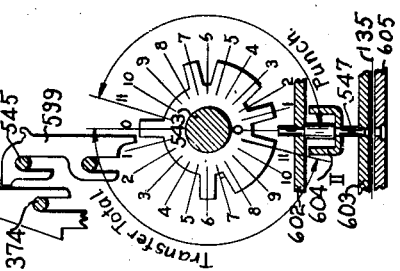
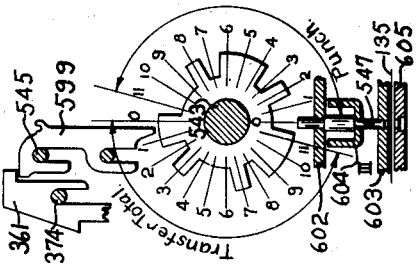
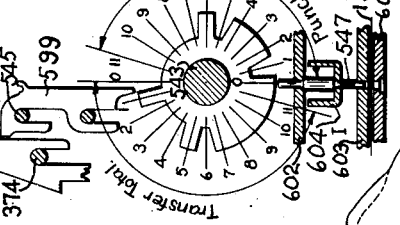
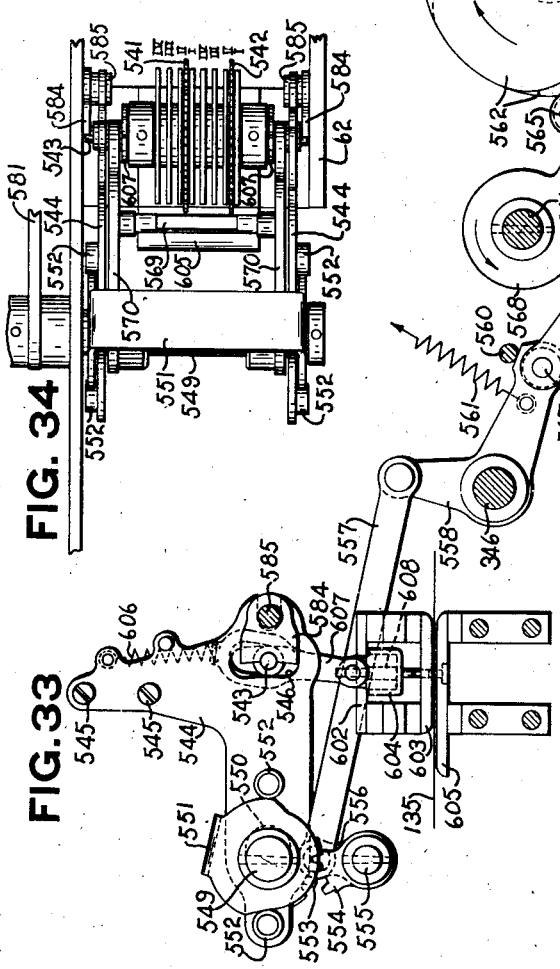
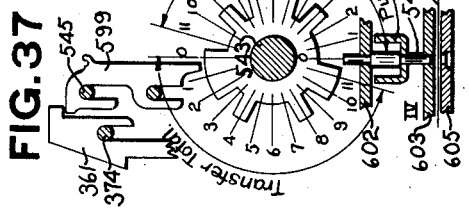
Inventor
Gunnar Nelson
By
Earl Benst
His Attorney

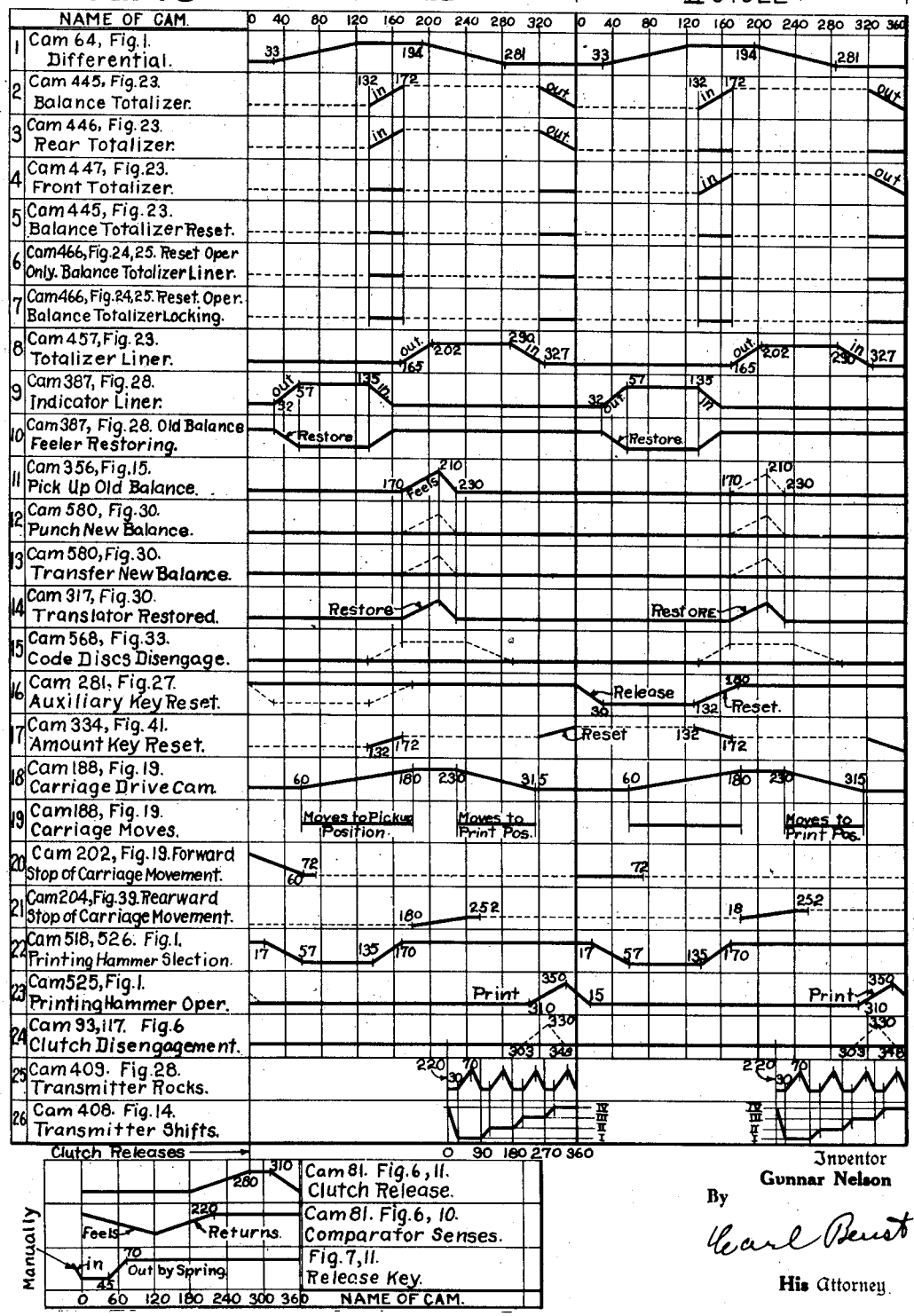

Jan. 27, 1942.    G. NELSON    2,270,960
ACCOUNTING MACHINE
Filed Jan. 21, 1938    16 Sheets-Sheet 15

Inventor
Gunnar Nelson
By
Earl Berst
His Attorney

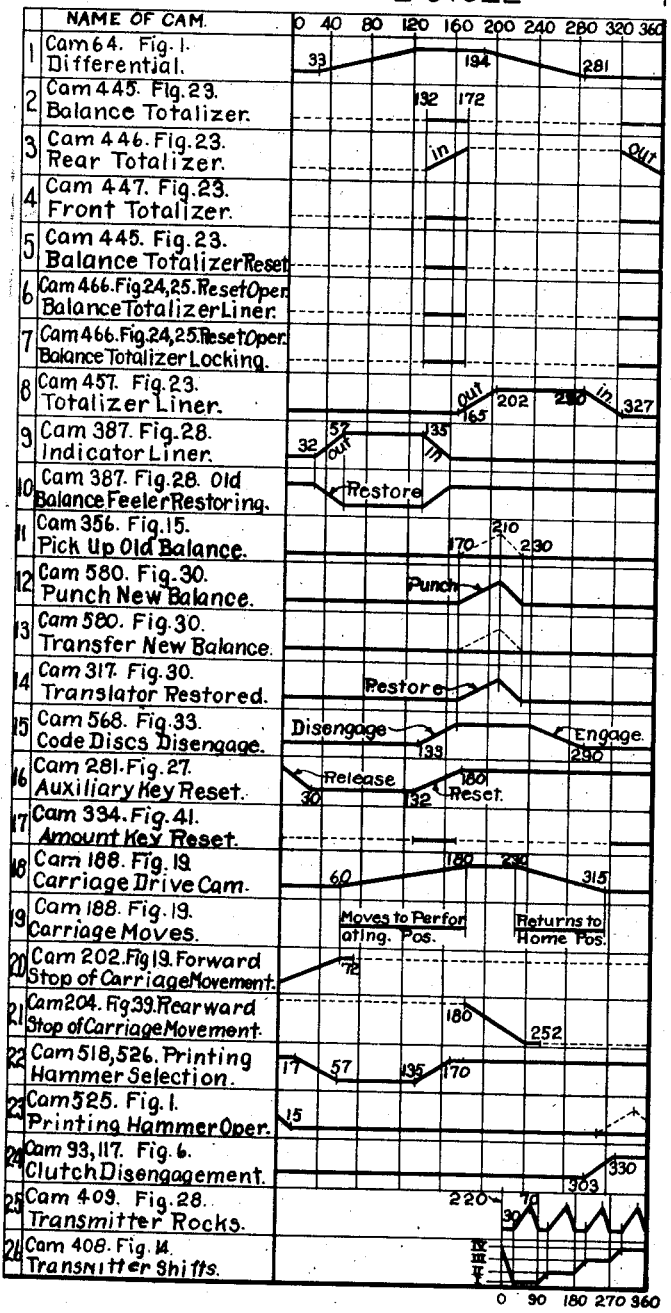

Patented Jan. 27, 1942

2,270,960

UNITED STATES PATENT OFFICE 2,270,960

ACCOUNTING MACHINE

Gunnar Nelson, Dayton, Ohio, assignor to The National Cash Register Company, Dayton, Ohio, a corporation of Maryland Application January 21, 1938, Serial No. 186,107

27 Claims. (Cl. 235—2)

This invention relates to improvements in cash registers, accounting machines and the like, and is more particularly directed to such a machine provided with automatic means to take data from record material having perforations or control points.

The machine of the instant invention contains amount keybanks, key mechanism, differential mechanism, totalizers, and driving means similar to that disclosed in United States Letters Patent No. 1,761,542, issued to Bernis M. Shipley, to which reference will be made from time to time for more complete description.

The machine is intended to be used for keeping duplicate records of a debtor-creditor account between two persons. Records of account are printed in duplicate by the machine on associated record materials, those being retained by the owner ordinarily being kept on ledger cards and those being retained by the customer ordinarily being kept in passbooks. Both a ledger card and a passbook are inserted in the machine on each transaction, the machine printing on each the old balance, the new transaction, and the new balance, and perforating the new balance on the ledger card. In the embodiment of the invention herein disclosed, a new ledger card and passbook are used on each transaction.

It is the principal object of this invention to provide mechanism, that is fully automatic and proof against operator's errors, for comparing identifying perforations on associated record materials such as a ledger card and a passbook for the purpose of making certain that they pertain to the same account. These perforations in the record materials are "read" or explored by feelers. If the perforations on the supposedly associated record materials are in agreement, the machine is automatically unlocked and proceeds with its main or accounting operation. If the identifying perforations are not in agreement the machine remains locked as concerns its main operation. Heretofore to accomplish such a result it has been necessary for the operator to perform some function, such as setting up the account number on the machine, after which conditioning process the machine would determine whether or not inserted record material bore equivalent perforated symbols. As the machine compares mechanically the perforated symbols of the associated record materials, the possibility of error in recording on unassociated record materials is eliminated.

Another object of this invention is to provide an improved mechanism for picking up the old balance, by means of feelers, from perforations on record material whereby data so picked up is entered into totalizers through the same differentials and keybanks as data entered into the totalizers under manipulative key control, thus making a more flexible machine and eliminating certain independent operations heretofore essential.

Another object of the invention is to provide means for transmitting to the keybanks the data picked up from the perforations by an internally geared, laterally moving transmitting mechanism whereby it is unnecessary to have each feeler coupled separately with the keybank, thus saving multiplicity of parts and conserving space.

Another object of the invention is to provide a novel mechanism for translating perforated symbols so that by use of an auxiliary set of spring urged keys the differentials may be set according to equivalent numerical positions.

Another object of the invention is to provide a novel means for transmitting and translating differential positions representing numbers to perforations in record material representing the same data.

Another object of the invention is to provide a remote control means for differentially setting selecting means for controlling perforating mechanism consisting of ring gears having internally geared shafts and pinions.

Another object of the invention is to provide a machine that will verify the identity of supposedly associated record materials, pick up an old balance from record material, add to it the new manually selected data, determine the new balance, print the three items on the associated record material, perforate the new balance on one of the record materials, add the old balances in one totalizer line and add the new balances and new transactions in another totalizer line in an uninterrupted operation without any act being required by the operator except to insert the record material, enter the new transaction on the amount keys, and start the driving means.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the figures:

Fig. 2 is the front half of the machine as viewed from the right side, part in elevation and part in section.

Fig. 3 shows a typical ledger card.

Fig. 4 shows a typical passbook.

Fig. 5 is a plan view of the machine with the keyboard, differentials and totalizers removed and the right side broken away between the keybanks.

Fig. 6 shows the release and locking mechanism for both the preliminary comparing operation and the main operation together with a side elevation of the comparator.

Fig. 7 is a detail view of the release mechanism for the preliminary comparing operation.

Fig. 8 shows the pawl for resiliently keeping the crankshaft in home position.

Fig. 9 shows the comparator analyzing mechanism, as viewed from the front of the comparator, with parts removed.

Fig. 10 shows the cam and follower for causing the sensing movement of the comparator feelers.

Fig. 11 shows the cam and follower for moving the latch bar to analyze the condition of the comparator.

Fig. 12 is a front elevation of the comparator.

Fig. 13 is a plan view of the comparator.

Fig. 14 is a plan view of the old balance pickup feelers, the transmitter, and the translator setting pawls.

Fig. 15 is a right side elevation of the mechanism shown in Fig. 14, together with the mechanism for causing the sensing movement of the old balance pickup feelers.

Fig. 16 is a detail view of the old balance pickup feeler mechanism, in rear elevation.

Fig. 17 is a representation of the code used for perforating the numbers in a decimal order.

Fig. 18 is a plan view of the driving elements for causing the sensing movement of the old balance pickup feelers.

Fig. 19 shows the mechanism for moving the record material carriages to the different operative positions.

Fig. 20 shows the homing pawl for the main drive shaft.

Fig. 21 is a front elevation of the mechanism for moving the record material carriages, the record material carriages and the printing wheels.

Fig. 22 is a plan view of a ledger card in its carriage.

Fig. 23 is a right side elevation of the totalizers and totalizer engaging mechanism.

Fig. 24 is a detail showing of the position of the balance totalizer engaging elements when the totalizer is out of engagement.

Fig. 25 is the same as Fig. 24 but shows the balance totalizer elements in position to be engaged by the differential.

Fig. 26 is a front elevation of the totalizers and their engaging mechanisms.

Fig. 27 shows the key restoring and zero stop throwout mechanism for the auxiliary keys.

Fig. 28 shows in side elevation the old balance pickup mechanism, the transmitter mechanism, the translating mechanism, and the auxiliary keybank.

Fig. 29 shows the four translator plates representing one keybank.

Fig. 30 shows the new balance transfer and perforating mechanism in side elevation.

Fig. 31 shows the perforator punches, translating discs and transfer plates in front elevation.

Fig. 32 shows a plan view of the drive mechanism for the perforating and transfer mechanism.

Fig. 33 shows the details of the perforator punch and die and its driving mechanism.

Fig. 34 is a plan view of the punch and transfer translator discs.

Figs. 35, 36, 37, and 38 show the four translator discs for the punches representing one keybank and transfer plates and their position when selected for punching or transferring zero.

Fig. 39 is a detail view of the cam controlling the rearward motion of the record material carriages.

Fig. 40 is a plan view of the duplicate printing mechanism.

Fig. 41 shows the amount key restoring mechanism.

Fig. 42 is a section through a keybank showing the wide differential latch.

Figure 44:
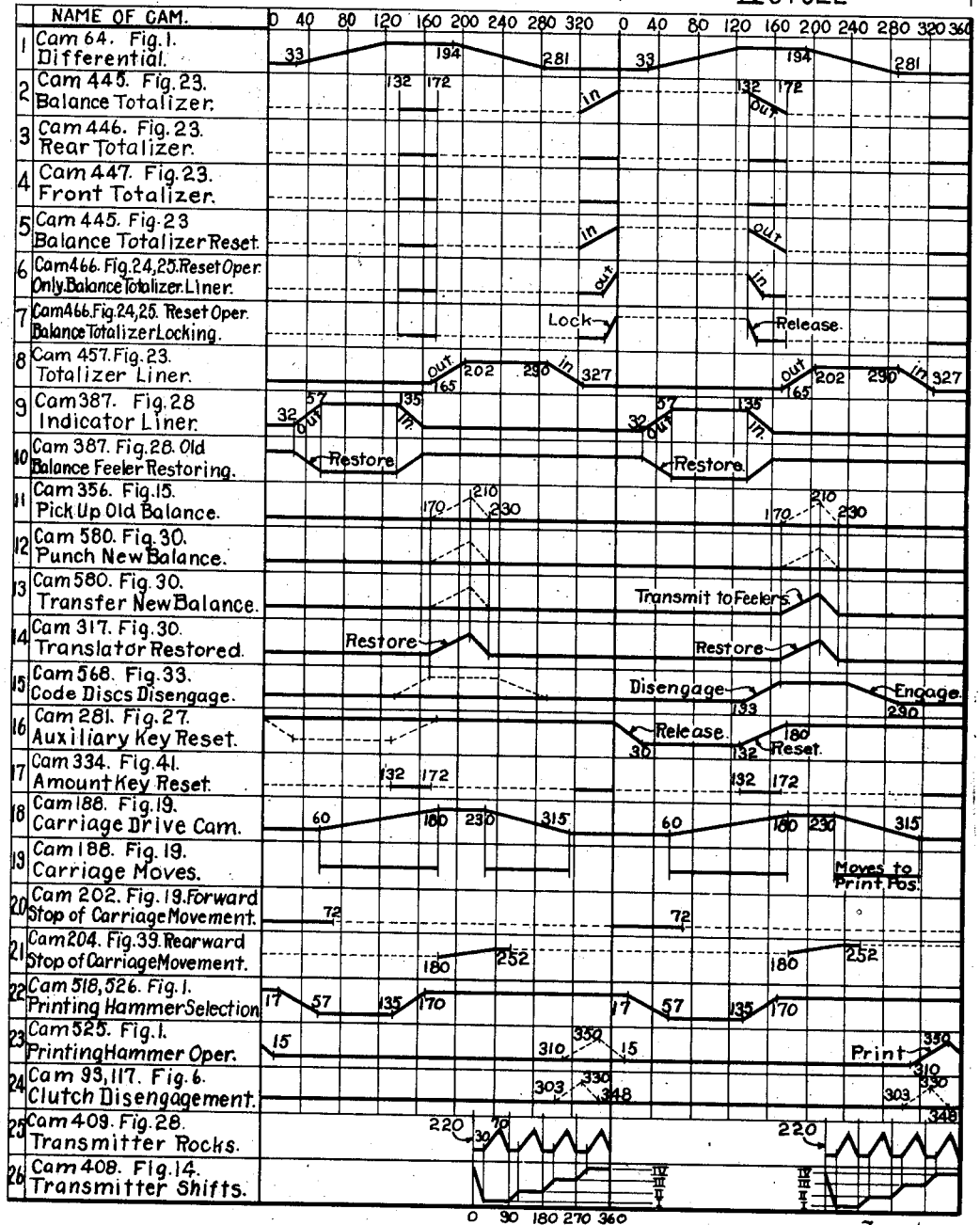

Figs. 43, 44, and 45 are graphs showing the relative timing of the various machine actions.

*General description*

The drawings illustrate the novel mechanism as embodied in the type of machine used for savings banks as set forth in the Shipley Patent 1,761,542, to which reference was made, having two banks of amount keys and their differentials, three totalizer lines, the top totalizer being a balance totalizer, the front totalizer containing the total of the old balances, and the rear totalizer containing the total of the new deposits and the new balances. The number of differentials, and banks of keys may be increased as desired and it will be shown that the new mechanism herein disclosed is adapted to be expanded likewise, some of the novel features of the invention being directed to that purpose.

The main drive shaft in one rotation performs one cycle of operation of the machine, and in a complete accounting operation five rotations of the main drive shaft or five machine cycles are required. In addition, there is a preliminary one-cycle operation of the special record comparing mechanism to determine whether the machine shall be released for the accounting operation. This preliminary comparing operation does not rotate the main drive shaft which remains stationary unless the comparing operation causes the release of the machine, whereupon the last 80 degrees of rotation of the crankshaft driving the mechanism for the preliminary comparing operation are coactive with the first 40 degrees of the first machine cycle of the main operation, the full comparing operation being equivalent to half of a complete rotation of the main drive shaft.

Only so much of the machine as disclosed in the Shipley Patent 1,761,542 as is necessary to show how the new mechanism is incorporated in and operates in combination with the old is set forth in this specification and accompanying drawings.

In general terms, the machine to be described is one particularly suited for use by tellers in savings banks or similar institutions, when a series of transactions are made at intervals on a running account between the debtor and creditor, but its use is not restricted to such institutions.

This machine in addition to the ordinary function of making duplicate printed entries, in a passbook and on a ledger card, proves mechanically that the passbook and ledger card match. At the time of starting an account the depositor is given a passbook previously perforated with holes in a certain pattern which represents the number of the account. The corresponding ledger card is perforated in an equivalent pattern. In a typical transaction the teller first places both the passbook and the supposedly associated ledger card in the machine. The amount of the deposit or withdrawal is manually set up on the keyboard and the mechanism started. The machine will compare the perforations in the ledger card with those in the passbook and if the perforations do not represent the same account number the machine will cease operating without starting its main or accounting operation. Only when the records of account represent the same account as determined by the perforations of the account number will the machine start its main operation and therefore a positive mechanical check is made of the card selected. Heretofore it has been necessary for the teller to condition the machine corresponding to an account number before the machine could verify the identity of the record material. The effort of setting up the account number and the likelihood of setting up the wrong account number are eliminated by the mechanism hereinafter disclosed.

If the machine proves that the ledger card and passbook match it continues operation, going through the five machine cycles of the accounting operation automatically. In the first machine cycle the deposit is added into the balance totalizer and the rear totalizer, the deposit is printed on the ledger card and passbook, and the old balance is picked up from perforations on the ledger card and retained in a storage device. In the second machine cycle the old balance is added to the deposit in the balance totalizer, added into the front totalizer, and printed on the ledger card and passbook. The third machine cycle is for positioning and resetting the various mechanisms. In the fourth machine cycle the new balance is cleared from the balance totalizer and printed on the ledger card and passbook and transmitted to the storage device. In the fifth machine cycle the new balance is taken from the storage device and added into the rear totalizer and perforated on the ledger card. At the end of the five machine cycles of the accounting operation the passbook contains the printed record of the transaction, and the ledger card contains the printed record of the transaction and in addition contains perforations representing the new balance.

Framework

Figure 1:
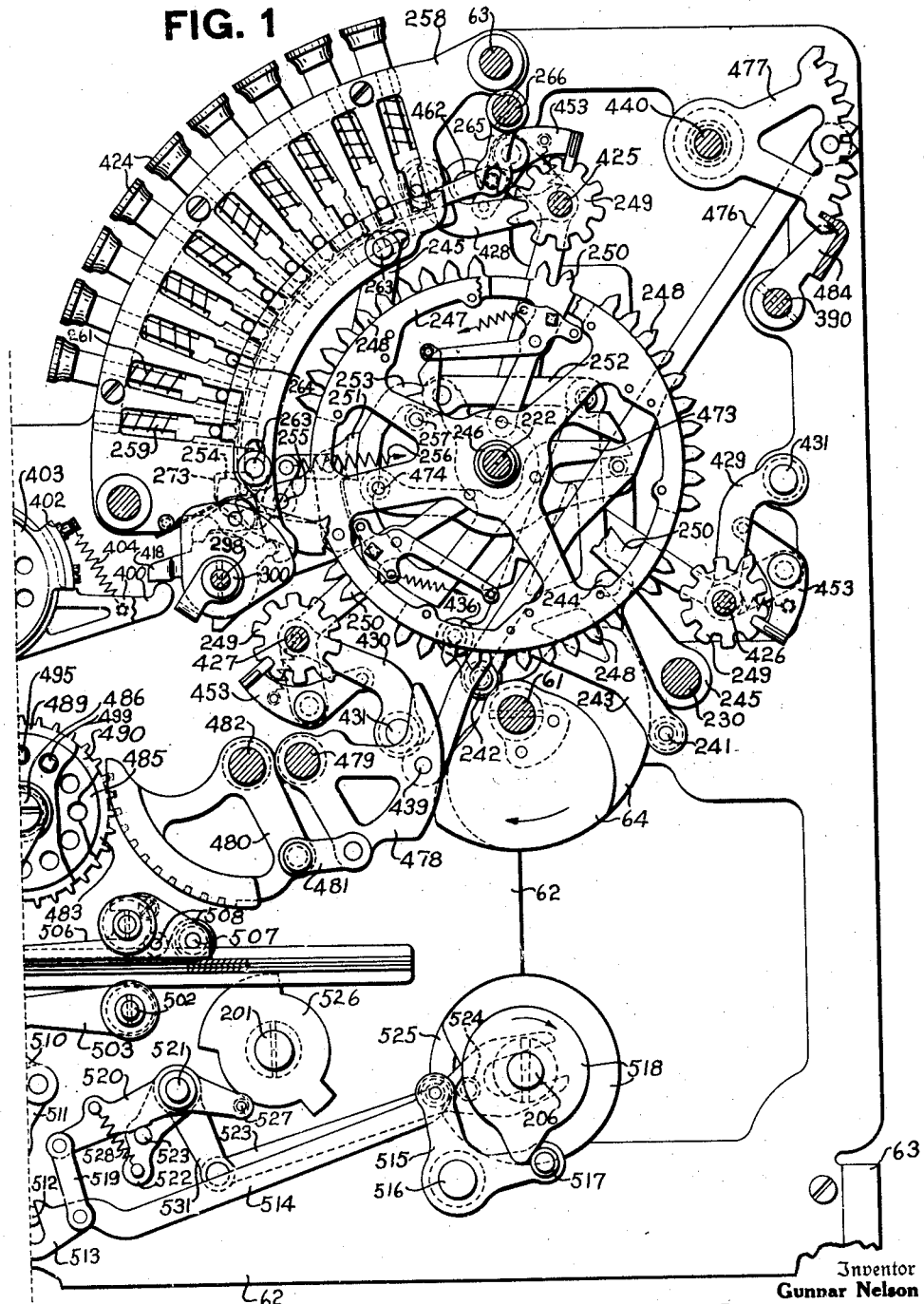
Fig. 1 is the rear half of the machine as viewed from the right side, part in elevation and part in section.

Figs. 1, 2, and 5 show the vertical plates 62 running from the front to the rear of the machine which are firmly joined together by cross pieces 63 to form the main framework of the machine.

Main driving mechanism

The main drive shaft 61 (Fig. 1) running from one side of the machine to the other and journaled in the framework plates 62, has secured thereon one set of double plate positive drive cams 64 for each keybank unit and its corresponding differential 247. As stated before, one rotation of the main drive shaft 61 constitutes one cycle of machine operation and by that motion the cams 64 drive the differentials clockwise and counter-clockwise in a complete oscillation.

The main drive shaft 61 is driven by a gear 67 (Fig. 30) which is journaled to a stub shaft 68 supported by the right frame 62, and gear 67 is in turn driven by gear 69 mounted on shaft 70 (Figs. 5, 15, and 30). Shaft 70 rotates twice for each rotation of the main drive shaft 61, such being the gear ratio. Shaft 70 is either turned by a suitable handle crank or by a motor such as disclosed in United States Letters Patent No. 910,690, issued to Charles F. Kettering.

The driving gear 69 (Fig. 6), loosely mounted on the shaft 70, may be turned by shaft 70 when engaged therewith by a clutch 71, one part of the clutch being fastened to gear 69. The clutch 71 is the same as that described in the United States Letters Patent No. 923,857 issued to Charles F. Kettering and reference is made thereto for a compelte description. It is sufficient for this disclosure to indicate that when the pawl 72 is thrust in the path of stop 73 preventing clockwise motion of that part of the clutch to which it is attached, the clutch becomes disengaged and the turning of shaft 70 will not drive the gear 69. The machine is released for starting its five machine cycles of the accounting operation by removing the pawl 72 from the path of rotation of stop 73, and is locked against operation by again causing pawl 72 to assume the position shown in Fig. 6.

For the purpose of comparing the ledger card and the passbook one preliminary rotation of shaft 70 in its normal clockwise direction is made, constituting the preliminary or record comparing operation. This preliminary operation will now be described.

The comparing cycle

Referring to Fig. 8 the shaft 70 has secured thereon a notched disc 74 cooperating with a spring-actuated pawl 75 to hold the shaft resiliently in home position. Also secured to the shaft 70 (Fig. 7) by a pin is a disc 76 having a shoulder 78 adapted to engage pawl 77 when the pawl is placed in its path, as will be explained. One of the purposes of the pawl 75 (Fig. 8) is to normally hold the disc 76 in home position ready for the shoulder 78 to engage pawl 77 without a wasted free rotation of the shaft 70 as would occur if shoulder 78 happened to be beyond the nose of pawl 77.

On shaft 70 is mounted a freely rotatable sleeve 79 (Fig. 7) on the left end of which is secured a bell crank lever 80 to the right end of which is tenoned a cam 81 (Figs. 10 and 11) also rotatably mounted on shaft 70, said cam consisting of a plate grooved on both faces to positively actuate two separate cam followers each of which is fastened to an associated lever. One arm of the bell crank lever 80 (Fig. 7) has pivotally mounted thereon the before mentioned pawl 77. Between pawl 77 and the other arm of bell crank lever 80 extends a spring 82 tending to draw the nose of pawl 77 into the path of movement of notch 78. This is prevented when the parts are in home position as shown in Fig. 7 by a latch 83 engaging the upper extending end of pawl 77 and the upper extending arm of bell crank lever 80, holding the pawl 77 away from the path of notch 78 against the tension of spring 82. In this position the shaft 70 turns idly.

Latch 83 is fastened to the end of a three armed lever 84 mounted rotatably on a stud 85 (Figs. 5 and 7) supported by the framework of the machine. The lever 84 is restricted in its motion around stud 85 by the pin 86 extending from the framework into an elongated slot 87 in the lever 84. The lever 84 is held in extreme clockwise position by spring 88. Downward pressure applied to the release key 89, which is on one arm of lever 84, will rotate said lever counter-clockwise slightly, limited by slot 87 and pin 86, raise latch 83, allow spring 82 to bring pawl 77 into the path of shoulder 78 and thus allow rotation of shaft 70 to turn sleeve 79 and cam 81 (Figs. 10 and 11) clockwise. Another result of the operation of key 89 (Fig. 7) is to draw link 90 slightly to the rear, the purpose of which will be explained later. Bell crank lever 98 (Fig. 7) rotatably mounted on stud 85 serves the purpose of keeping the bell crank lever 80 from counter-clockwise rotation when it is in home position.

One revolution of the shaft 70 will, when key 89 is depressed, rotate the sleeve 79 clockwise and carry with it the cam 81 (Figs. 10 and 11). Release of key 89 (Fig. 7) meanwhile has allowed the lever 84 to move to its home position, placing latch 83 in the path of the upper extending arm of pawl 77 which upon completion of one revolution disengages the shaft 70 from the sleeve 79 and cam 81, and causes the upper extending arm of bell crank lever 80 to be stopped in home position by latch 83. This constitutes the drive for the preliminary record comparing operation.

It is during this operation that the comparing of the ledger card perforations with those of the passbook takes place and it is determined whether or not further rotation of shaft 70 will operate the main drive shaft 61 (Fig. 1).

The position of lever 101 (Fig. 6) rotatably mounted on a stud 102 fastened to the frame of the machine is determinative as to whether the pawl 72 shall be withdrawn from stop 73 thus allowing the clutch to engage, other conditions being favorable, or whether the clutch shall remain disengaged. The pawl 72 is secured to one arm of a three armed lever 103 rotatably mounted on a stud 104 projecting from the framework of the machine. Spring 105 fastened to another arm of lever 103, under tension, tends to rotate the lever 103 clockwise and withdraw pawl 72, engaging the clutch. Stud 106 on the third arm of lever 103 is engaged by retaining lever 107 when the machine is at rest and prevents the clockwise rotation of the lever 103. Removal of lever 107 from engagement with stud 106 is accomplished by the cam 81 (Figs. 6 and 11) and the link 108. Referring to Fig. 11 which shows cam 81 in the rest position and the arrow showing its direction of motion, it is apparent that at approximately the 180th degree of rotation of the shaft 70 and cam 81, the stud cam follower 109 will be drawn toward the center of shaft 70. This cam follower mounted on and projecting from link 108 causes the link to be drawn in the same direction. The forward end of link 108 is bifurcated to engage a circumferential groove in sleeve 79 serving to hold the link against lateral movement and to hold the cam follower in the cam groove. The motion to link 108 imparted by the cam causes lever 110 to turn slightly in a clockwise direction, against the tension of spring 113. Link 108 at its rear end contains an elongated slot 91 engaging a pin 92 on lever 110. Lever 110 is attached to a yoke 111 (Fig. 6) rotatably mounted on a shaft 266 journaled in the framework. On the other end of yoke 111 is the retaining lever 107 which also will be turned clockwise with lever 110, freeing stud 106 and permitting the lever 103 to turn clockwise in response to the tension of spring 105. Lever 101, however, through its bifurcated rear end engages a stud 112 on pawl 72 which will prevent the clockwise motion of lever 103 if the lever 101 is held stationary against a slight counter-clockwise rotation. Therefore blocking the movement of lever 101 can control the release of the main operating mechanism of the machine by permitting or preventing the clutch being engaged. This determinative point is at approximately the 280th degree of the rotation of shaft 70 and of cam 81 when stud 106 is freed. If the lever 101 is permitted slight counter-clockwise movement at this point the clutch engages. If the lever 101 is kept from such motion the clutch will remain disengaged. The last 80 degrees of rotation of cam 81 moves link 108 away from shaft 70 allowing spring 113 to move retaining lever 107 into engaging position with stud 106, providing roller 114 has not been caught by the flange 115 on plate 116, which plate starts to rotate as soon as the clutch engages. The flange 115 is so formed that when the machine is at rest the roller may enter and leave through a break in its circumference 117, but once the main operating mechanism has started, the roller 114 is unable to leave the retaining action of the flange until the main drive shaft has made five rotations, because the flanged plate is rotated one complete turn for every five rotations of the main drive shaft, said plate being mounted on and turned by shaft 118 which operates the totalizer engaging mechanism and whose rotation will be discussed when that subject is treated. If the lever 101 is prevented from rotating slightly counter-clockwise, as would happen if its forward end were held from dropping, the machine would not be released, plate 116 would remain stationary allowing stud 114 to escape, the stud 106 would be reengaged by lever 107, and the cam 81 would turn its last 80 degrees of rotation until the latch 83 catches the pawl 77 stopping the movement of cam 81.

Clockwise movement of lever 103 (Fig. 6), causing engagement of the clutch, will cause stud 106 to move to a point out of reach of engaging motion of lever 107. To bring stud 106 into position where it may be engaged by lever 107 at the end of the fifth rotation of the main drive shaft, a link 94 pivoted to lever 103 and slidably mounted on stud 96 is rocked upward near the end of each machine cycle. The rocking motion is supplied by a stud 93 fastened to gear 67, which gear makes one rotation each machine cycle, said stud engaging a cam foot at the base of link 94. The upward thrust of the link causes lever 103 to move counter-clockwise against the tension of spring 105 bringing stud 106 into position where it may be engaged by lever 107. During the fifth rotation of the main drive shaft the lever 107 does engage stud 106 and the clutch is disengaged. During the first four rotations of the main drive shaft the stud 106 is not so engaged and the link 94 lowers after roller 93 ceases its camming action allowing pawl 72 to return to its ineffective position before it engages stop 73.

A link 119 (Figs. 6 and 7) pivoted to stud 92 at its rear end and bifurcated at its forward end to straddle stud 85 moves forward when the lever 110 rotates clockwise, carrying with it pin 120 (Fig. 7). When link 119 is in the forward position the pin 120 prevents the lever 84 from turning counter-clockwise. This is a safeguard to prevent the operation of the record comparator during the accounting operation of the machine.

Situated in the front part of the machine is the mechanism for determining whether the lever 101 will be allowed to rotate counter-clockwise and this will now be described.

The comparator

The machine is so designed that it will not be released for its accounting or main operation unless the perforations on the ledger card representing the account number match exactly the perforations on the passbook representing the account number. This work of comparing is accomplished by two gangs of sensing probes or feelers, one gang for the passbook and one gang for the ledger card. If the two gangs of feelers are differentially set by perforated record materials representing the same account number the lever 101 will be allowed to rock counter-clockwise and release the machine. If the perforations in the record material compared by the two gangs of feelers do not represent the same account number lever 101 is blocked against rocking and the machine will not be released.

The mechanism designed to analyze the two sets of perforations will hereinafter be termed the "comparator."

Fig. 3 represents a typical ledger card and Fig. 4 represents a typical passbook, adapted to be folded on the dotted line but intended to be placed in the record material carriage in the open position. The perforations 131 (Figs. 3 and 4) representing the account number are shown to be alike both as to number and relative position of the perforations, except the ledger card perforations are in converse order to those in the passbook. The account number "47" inscribed at the top of these records is represented by the perforations according to the code shown in Fig. 17. Each digit is given a space in which to be represented, said space being wide enough to accommodate four perforations side by side. For an account number containing two digits, a space accommodating eight perforations is needed. The code represented in Fig. 17 shows the four spaces representing a single digit indicated by the Roman numerals I, II, III, IV. The Arabic numerals 0, 1, 2, 3, 4, 5, 6, 7, 8, 9 represent the number to be encoded. For instance the number "4" requires perforations of the I, II, III positions and no perforation in the IV position.

Referring to Fig. 3, the three perforations to the left of the dotted line 131 represent the "4" of the account number. The two perforations to the right of the center line represent the "7" in the account number as is evident from reference to the code in Fig. 17. In Fig. 4 the converse order of perforation shows the same number "47."

There are two sliding carriages provided for holding the record material. In Fig. 5, a plan view, are shown the ledger card carriage 132 and the passbook carriage 133 lying adjacent and parallel. Fig. 21 shows the relative positions of these carriages in front elevation. Fig. 22 shows the ledger card in its carriage and the slot 134 in the floor of the carriage for allowing those feelers encountering perforations to enter the perforations and penetrate slightly below the floor of the carriage, while those feelers encountering no perforations are stopped by the card. The difference in vertical position of the feelers being the principle on which this sensing means acts, it is necessary to allow the feelers to pass through the perforations to furnish the measurable differential positions.

In Fig. 12 the position of the ledger card is indicated by line 135 and the passbook by line 136 both being viewed on the bottom edge as they rest in their respective carriages in position to be analyzed by the comparator.

Attached to the vertical frame plates 62 (Fig. 12) are a set of upper studs 137 (Figs. 12 and 13) and a set of lower studs 138 to guide and support the frames 142 which hold the plates 154 and attached feelers 153 used for exploring the perforations in the record material directly below. The frames 142 are tied together by rod 141 and are oscillated up and down together during the preliminary record comparing operation, carrying the plates 154 and attached feelers 153 with them. Both frames 142 being alike, the description now given applies to both. Referring to Figs. 2, 12, and 13 the frames 142 are composed of side pieces 142 joined by cross pieces 143 on the front side and by the rods 144 on the rear side. The lower ends of the side pieces of each frame are bifurcated to straddle the studs 138. The left side pieces have upper extending portions developed into hooks 146 (Figs. 2 and 12) adapted to engage studs 137. The tie rod 141 (Figs. 2 and 12) before mentioned runs through holes in the top of hooks 146 making a unit of the two frames, capable of being moved up and down on the described supporting studs 137 and 138. The frames, on account of their mode of construction and support, cannot be moved in any but a vertical manner, both frames to the same degree and at the same time. The frames 142 in their rest position are elevated as shown in Figs. 2 and 12 so the feelers 153 are above the record material. On the preliminary record comparing operation the frames are lowered and raised by the forward and backward motion of link 148 (Fig. 6) given by the cam 81 in the first 220 degrees of its 360 degrees of rotation. The cam groove imparting the motion is on the left face of cam 81 and is shown in broken line in Fig. 10. The rear end of link 148 is bifurcated to ride on shaft 70 and supports a stud cam follower similar to that on link 108 (Fig. 11) previously described. The forward end of link 148 is attached to the upper end of a bell crank lever 149 (Figs. 6 and 12) secured on a rod 150 journaled in the plates 62 of the frame. The forward extending end of the bell crank lever 149 is bifurcated and engages a stud 151 (Fig. 12) on the left side of the left frame. Also secured on the rod 150 (Figs. 6 and 12) are bifurcated levers 163, 164 and 165, engaging studs 166, 167 and 168 on the right side plate of the left frame and the left and right side plates of the right-hand frame. When link 148 moves forward the frames move down and vice versa.

The feelers, feeler plates, and feeler retaining hooks located and mounted within the frames will be next described.

In Fig. 6 the feelers 153 used to explore for perforations are shown attached to plates 154, each plate having a bifurcated portion at top and bottom for hooking over cross rods 144 allowing said feeler plates to move only in a vertical direction. The cross rods 144 have circumferential grooves in which the bifurcated portions of the feeler plates slide to prevent their lateral displacement.

There are eight feeler plates 154 to each frame, each frame being able to explore perforations representing a two digit number.

These feeler plates 154 are yieldingly held in their lowest position in the frames by means of individual springs 156, the upper ends of the springs being attached to hooks on the upper parts of the plates, and the lower ends being attached to a cross rod 170 whose ends are fastened in the sides of the frames 142.

The tie rod 141 (Fig. 12) in addition to fastening the two frames together as a unit, acts as a pivotal support for a series of lever retaining pawls 157 there being one of these retaining pawls for each feeler plate 154 and adapted, when any feeler plate is raised to its upper position against the tension of a spring 156, to engage a step on the forward upper end of the feeler plate and hold it in raised position until released by a disengaging motion of the retaining pawl. In Fig. 6 the hook 158 of the retaining pawl 157 engages the shoulder 159 on the feeler plate when the feeler plate is raised. The retaining pawls 157 are held in counter-clockwise tension by springs 162, and are nosed aside on upward movement of the feeler plates said pawls engaging the shoulders 159 when the plates reach the top of their upward travel in the frame.

Upon preliminary operation of the machine, the frames are lowered as has been described, so that the feelers, unless stopped, descend through the slot in the carriage provided for that purpose. If a ledger card, containing an account number perforated in code thereon, is placed on the record carriage and the frames lowered, some of the feelers not contacting perforations will be stopped and their plates raised differentially to the other plates whose feelers enter perforations, whereupon the retaining pawls will hold those plates not contacting any perforation in the raised position. When the frames are raised the differential position of the plates will be maintained.

On a cross piece 169 (Fig. 12) between the frames 62 is secured a stud 160 extending forwardly through elongated holes 161 (Figs. 9 and 12) in eight balance beams 171. Each beam 171 touches on the rearwardly projecting step 172 (Fig. 6) of two feeler plates 154, one of said plates being in the frame holding the feeler plates for the ledger card and the other being in the frame holding the feeler plates for the passbook. The ends of a particular beam rest only on the two feeler plates representing the same code position for the same digit. Fig. 13 shows the arrangement of the steps and beams necessary to accomplish this result. The outer plates in each frame have the longest step and support the longest beam, the inner plates the shortest step and support the shortest beam. To start the main operation it is necessary, as will be explained, for all these beams to be horizontal when the lever 101 tries to rock counter-clockwise. As a raised feeler plate will rock its associated beam around stud 160 if not balanced by a raised feeler plate on the other end, it is necessary to have the code perforations on the ledger card the exact converse of those on the passbook if the beams are to be kept horizontal. The beams are mounted independent of the frames and hence are not affected by the lowering and raising of the frames unless a feeler plate is left in raised position whereupon the frame on its upward motion causes the particular beam to be displaced by the raised feeler plate.

If the machine were operated without any ledger card or passbook, the frames would be lowered, and all the feelers would pass through the apertures 134 made for that purpose in the carriages, and there would be no differential motion of the feeler plates and the beams would remain in normal horizontal position.

It is obvious, now, that if a perforated ledger card and perforated passbook, not matched, were placed in the machine and the frames lowered, some of the feeler plates would be raised on one side while the corresponding plates were not raised on the other side. It is this condition that causes one or more of the beams to assume a position that is not horizontal. The method will now be described for analyzing the position of the beams to determine whether any one is out of horizontal position and if so how that situation keeps the machine from releasing for the main operation.

Rotatably mounted on stud 160 (Fig. 12) are two yokes 173 and 174 fitted with upwardly extending bifurcated portions 175 (Fig. 9) at their rear ends. These bifurcations 176 are designed to be entered by the forward end of lever 101 (Fig. 6) before mentioned, as it descends when spring 105 withdraws pawl 72 to engage the clutch. Therefore if one or both of the bifurcations 176 of the yoke ends are not directly in line with the end of lever 101 when it tries to enter, the lever 101 will be blocked against turning counter-clockwise and pawl 72 remains in place, keeping the clutch disengaged. The bifurcated ends of the yokes, both of which are shown in Fig. 12, are held yieldingly together by a spring 177 against upwardly projecting portions 178 (Fig. 9) of the beams 171. The beams 171 are held yieldingly in lowest position so as to touch the steps 172 (Fig. 6) by springs 179 (Fig. 12), which are attached between eyelets 180 and plate 181 on the frame of the machine. This construction normally holds the yokes 173 and 174 in position to receive lever 101 which position may be altered by lifting either end of a beam without lifting the other end, causing the projecting portion 178 (Fig. 9) to turn the yoke 174 on stud 160 if any beams are raised on their left ends only or to turn yoke 173 if any beams are raised on their right ends only. In either case the lever 101 will be blocked from turning.

When a beam 171 is raised on either side by reason of the associated feeler plates encountering corresponding data in the record materials, the elongated holes 161 allow vertical displacement of the beams without disturbing the normal position of the yoke members 174 and 175.

This constitutes the comparator and its work is done during the preliminary record comparing operation.

The comparator is not restricted to comparing data on two pieces of record material. It is evident that a plurality of ledger cards superimposed one upon the other and placed in the ledger card carriage could be tested by the sensing pins against a passbook on the other carriage. The same holds true as regards the passbooks. A plurality of passbooks superimposed could be tested against a ledger card or plurality of ledger cards.

The feeler plates that have been raised and hooked by the retaining pawls 157 stay in that position during the entire operation of the machine and until the release key 89 (Fig. 6) again is pressed for a new operation. The act of pressing down on the release key 89 turns the lever 84 counter-clockwise on stud 85 drawing link 90 to the rear slightly. Link 90 at its forward end is fastened to a yoke 182 (Figs. 6 and 12) securely mounted on shaft 141. Rearward movement of the link 90 causes the yoke to force the top of retaining pawls 157 to the rear, causing the lower ends of the pawls to disengage the feeler plates which then are pulled to their lowest positions by springs 156. The turning of rod 141 imparts the same motion to the yoke 182 on the ledger card side, said yoke being securely fastened thereto.

Record material carriages

For positioning the record material for the various printing, perforating and sensing operations, it is necessary to provide movable carriages. The carriages 132 and 133 (Fig. 5) are slidably mounted on flanged rollers 183 (Fig. 19) to allow forward and backward movement. On the underside of carriages 132 and 133 are racks 184 (Figs. 2 and 21) running from front to back, designed to be engaged by pinions 185 (Fig. 21) secured to shaft 186 journaled in the frame plates of the machine. Turning shaft 186 moves the two carriages on their rollers under positive control and to the same relative position. On the left end of shaft 186 is a pinion 187 (Figs. 19 and 21) differentially positioned by a set of complementary racks shown in Fig. 19. Secured on the left end of main drive shaft 61 is a double plate cam 188 (Fig. 19) acting to positively drive a rotatably mounted three armed lever 189 clockwise then counter-clockwise, two of the arms bearing rollers 190, acting as cam followers. The third arm 192 is bifurcated to embrace a stud 193 on a slide 191. Slide 191 has elongated slots at either end to accommodate studs 194 projecting from the left frame plate 62, which studs support and guide the slide. The studs 194 are so positioned that slide 191 may be moved forward and backward the length of the slots and the slots are of the right length to allow slide 191 to be fully reciprocated by lever arm 192 through stud connection 193. Slide 191 makes one forward and backward reciprocation while the main drive shaft 61 rotates once. Rotatably mounted on a stud projecting from slide 191 is a pinion 195 adapted to engage racks on similar slides mounted above and below slide 191. A rack on the lower side of the upper slide and a rack on the upper side of the lower slide are meshed with pinion 195. The upper slide rack 196 and the lower slide rack 197 thus have complementary motions, so that if one is stopped the other moves, as long as slide 191 is moving. The lower rack slide 197 has an additional rack on its under side engaging and driving gear 187 mentioned above. Therefore the movement of the lower rack slide governs the movement of the carriages. If the upper rack slide 196 is held stationary and the middle slide 191 is moved forward by lever 189 the lower rack slide will be forced forward twice the distance in the same direction. The reverse is true. If the lower rack slide 197 is held stationary the upper slide rack will idly move twice the distance and in the same direction as the middle slide 191, the carriages remaining stationary. To position the carriages, lugs 231, 232, 233, and 234 are provided to project from the rack slides 196 and 197 and designed to be stopped by bumpers that are moved to and from effective position by means of cams and levers, which mechanism will now be described.

On shaft 201 (Figs. 19 and 39) which is journaled in the frame of the machine are two cams 202 and 204 hubbed to Geneva wheels 203 and 205, each cam and its Geneva wheel being independently rotatable on shaft 201. Cam 202 and its Geneva wheel 203 are mounted to the right. The other Geneva wheel 205, shown in Fig. 19 behind Geneva wheel 203, has a cam 204 of different shape which is shown separately in Fig. 39. The lateral spacing of these Geneva wheels and cams are shown in Fig. 21. The Geneva wheels each have five positions and therefore the cams attached to each, by hubs, have five machine positions. These positions correspond to the five cycles of the accounting operation before mentioned. Secured to shaft 206 (Fig. 19) journaled in the machine frame are locking wheels 207 and 208 for the Geneva wheels 203 and 205 respectively. As shown in Fig. 30, shaft 206 is geared to the main drive shaft 61 so as to rotate in the same direction and at the same angular velocity. The locking wheels are set on the shaft so their unlocking action takes place in alternate 180 degrees of rotation of shaft 206, making the Geneva wheels 203 and 205 move alternately. Wheel 203 has the first motion in the series. Sandwiched between the locking wheels 207 and 208 and fastened to them is a single driving lever 209 (Fig. 19) bearing studs at either end. Stud 210 projects into the plane of Geneva wheel 203 and stud 211 projects into the plane of Geneva wheel 205. These studs 210 and 211 are the driving means for the Geneva wheel into whose plane of motion they project. Each Geneva wheel is rotated 72 degrees for every complete rotation of its locking wheel. Cams 202 and 204 (Figs. 19 and 39) have followers 212 and 213 respectively. Cam follower 213 is mounted on lever 216 (Fig. 39) pinned to shaft 214. Cam follower 212 is mounted on one arm of yoke 215, said yoke being loosely mounted on shaft 214. Lever 219 (Figs. 19 and 39) is also pinned to shaft 214 and therefore moves in response to the action of cam 204 on its follower 213. Springs 222 hold the cam followers against the cams 202 and 204 at all times. The left arm 221 of yoke 215 extends forward in similar fashion to lever 219 and moves in response to the action of cam 202 on its follower 212. The forwardly extending lever 219 and arm 221 are bifurcated so that each may engage a stud on an associated vertically movable slide. These slides 217 and 218 are mounted on studs 229 projecting from the framework of the machine into elongated slots 220. At its rest position slide 218 is in the raised position as shown in Fig. 19, and during the five machine cycles of the accounting operation is moved once, in the first cycle, to its lower position where it remains until the end of the fourth cycle whereupon it is returned to its rest position. Slide 218 governs how far forward the lower rack shall move and slide 217 governs how far rearward the lower rack shall move. The slide 217 has a series of irregularly stepped projections on its forward edge designed to engage the adjustable stops 231 and 232. The slide 218 has two projections extending from its rearward edge designed to engage the adjustable stops 233 and 234. Between the first and the 60th degree of the 360 degrees in the first machine cycle of the accounting operation, slide 218 is lowered, bringing projection 235 into the path of stop 233 on the rack slide 196 which is then moving forward under the influence of cam 188, causing rack slide 196 to stop and rack slide 197 to move forward so that the holes 236 (Fig. 22) of the record material come directly under the old balance pickup feelers. On the last half of the first machine cycle, as the rack slide 191 is being drawn to the rear, slide 217 is raised so that stop 231 comes to rest against the surface 237. This results in the carriage being moved to the rear so the printing wheels are over the line on which the deposit is printed, as shown in Fig. 22. The position of printing line in relation to the rest position of the carrage machanism is shown in Fig. 19. In the first half of the second machine cycle of the main operation, the carriage is moved forward, as in the first half cycle, in an idle motion, the purpose being to get slides 196 and 197 to their forward position. On the second half of the second machine cycle, slide 217 moves upward slightly, bringing surface 238 into the plane of motion of stop 231 so that between the 230th and 315th degree of the second machine cycle the carriage is positioned so as to print the old balance on the line provided therefor (Fig. 22). In the third machine cycle of the accounting operation, the slides 196 and 197 again move forward, and the slide 217 raises slightly to bring surface 239 into the plane of motion of stop 231. On the completion of its movement in the third machine cycle, the carriage is positioned at its new balance printing point, but in this cycle no operation affecting the record material occurs. On the fourth machine cycle of the accounting operation, the slide 196 again moves forward then rearward as in the preceding cycles, the slide 217 meanwhile having again raised slightly, but not enough to move the surface 239 from the path of stop 231. The carriage is then positioned as in the third machine cycle, but in this fourth cycle the new balance is printed on the line provided. In the fifth machine cycle of the accounting operation, slide 218 is raised, and slide rack 196 makes a complete forward movement before slide rack 197 moves forward, thus bringing under the punches the portion of the ledger card to be perforated with the new balance. On the last half of the fifth machine cycle of the accounting operation, the slides are moved to their home position. For the timing of these movements reference is made to Figs. 40, 41, and 42.

*Differentials*

The differential racks 247 (Fig. 1) for entering data into and withdrawing data from the totalizers make one complete oscillation for each of the five machine cycles of the accounting operation. One of the novel features of this invention as regards the differentials is that they make five oscillations in uninterrupted succession after the accounting operation is commenced without further act or control by the operator, during which five oscillations the various totalizers are engaged and disengaged in individually timed sequence to perform a complete accounting transaction. As the construction of the differentials and their driving mechanism is well known in the art, only a short description will be given, reference being made to the Shipley patent mentioned previously for further information.

There is one complete differential unit for each amount bank, but as they are identical in construction and operation the description applies to both. To drive the differential mechanism, the drive shaft 61, heretofore mentioned, is provided with two pairs of double plate cams 64 (Fig. 1), one pair for each keybank and its differential. Each pair of cams cooperates with roller followers 241 and 242 (Fig. 1) carried by three armed levers 243, of which there is one for each differential. Each of these levers 243 is pivoted at 244 to the differential frame 245, said frames being mounted at points 298 and 230 (Fig. 1) to the main framework. Loosely mounted on sleeves 346 journaled in the frames 245, are rotatably mounted differential actuators 247 each carrying three racks 248 for operating totalizer pinions 249. The racks each are supplied with transfer arms 250 for carry-over operations in the usual manner. The rod 222 (Fig. 1) inserted through sleeves 246 serves as additional support for the differential frames, said rod being journaled in the side plates of the frame.

The levers 243 are pivotally connected at the ends of their upwardly extending arms by links 252 to driving segments 253 rotatably mounted on rod 222. The driving segments 253 have an invariable oscillating motion and carry the differential actuator racks with them on the clockwise motion until the latches 251, normally fastening the actuator racks and the driving segments together, are broken by a depressed key, thus disengaging the driving segments from the actuator racks. The latches 251 are disengaged by the toe of the latch lever 254 striking a depressed key or other obstruction placed in their paths of motion whereupon the bell crank levers, of which the toes 254 form a part, pivot on studs 255 and pull the latches 251 from the shoulders on the driving segments against the tension of springs 256. On the counter-clockwise motion, the driving segments 253 engage studs 257 on the actuator racks at the same instant the latches are drawn to home position by springs 256 and the driving segments and actuator racks return to their initial position. This complete oscillation of the differential racks occur during one complete rotation of the main drive shaft 61.

*Keybanks*

In the disclosed machine there are two differentials, each differential representing a numerical order. Each differential is controlled by two coactive keybanks, one keybank manually controlled and the other keybank controlled by record material. Of these two adjacent coactive keybanks representing one numerical order and operating the same differential, the left-hand bank contains manually operated keys 424 (Fig. 1), key detents, key return springs and zero stop mechanism similar in construction to that set forth in the Shipley Patent 1,761,542 to which reference has been made.

Inasmuch as the manually operated keys complete their function in the first machine cycle of the accounting operation, the manual key detent release mechanism functions only between the 320th and 360th degree of the first machine cycle. The mechanism for releasing the keys consists of a yoke 318 (Fig. 41), rotatably mounted on the key lock shaft 266 journaled in the framework, having a forwardly extending arm 319 engaging the detent plate release lever 320 so that counter-clockwise motion of the yoke 318 effects such release. A rearwardly extending arm 331 of the yoke 318 is connected to a link 332 by pivot 333. The other end of link 332 is bifurcated to straddle shaft 118 (Figs. 6 and 41) which shaft has mounted thereon a cam 334 (Fig. 41), adapted to engage a stud cam follower 335 projecting from link 332. The bifurcated end of link 332 rides between the framework of the machine and the cam 334 to prevent lateral motion. Shaft 118 in line with center 222 (Figs. 1 and 26) rotates once in five machine cycles of operation, having two 36 degree movements each cycle. The motion of this shaft will be explained when the totalizer engaging mechanism is explained. It is in the last half of the first machine cycle of the accounting operation that the cam on its second movement of 36 degrees raises the link 332, releasing the depressed finger operated keys.

The auxiliary or record controlled keybanks 258 (Fig. 28) lying adjacent and parallel to the manually operated keybanks operate to break the latches of the same differential as does the manually operated keybank with which each is coactive. Depressed auxiliary keys are adapted to block the path of an extension 272 (Fig. 42) of the reset spider 273 (Figs. 1 and 42) which has the same effect on the latch as though the toe 254 were blocked. The auxiliary keybank has ten keys instead of the nine usually found in an amount bank, the extra key 259 (Figs. 1 and 28) being zero and placed next below the "one" key. The zero key in the auxiliary keybanks is for breaking the latch at zero when the auxiliary keys are controlling the differential and the regular zero stop pawl has been rendered ineffective, as will be explained in detail later. The frame of the auxiliary keybank 258 contains aligned slots so the keys may move radially to the center 222 (Fig. 1). Pins 264 (Fig. 42) inserted through the inner ends of the keystems act to break the differential latch when a key is in the depressed position. The auxiliary keys have no finger tips and are provided with springs 261 (Figs. 28 and 42) that constantly urge the keys to their effective or depressed position. Mechanism is provided to normally prevent the auxiliary keys from assuming the depressed position. First, an auxiliary key restoring plate 262 (Fig. 27), slidably mounted on studs 263 (Figs. 27 and 28), when in home position as shown in Fig. 27 holds the auxiliary keys in raised and ineffective position by means of the raised portions 271 (Fig. 27) engaging the pins 264 projecting laterally from the keystems. This key reset plate is moved upwardly, to allow the auxiliary keys to move inwardly, urged by their individual springs 261 (Fig. 28), once during each second, fourth, and fifth cycles of operation. Lever 265 secured to the key lock shaft 266 (Figs. 27 and 28) oscillates slightly first counter-clockwise and then clockwise so as to move the key restoring plate to released position during the first 30 degrees of the second, fourth, and fifth machine cycles and to key restoring position between the 132nd and 180th degree of the same machine cycles. Key lock shaft 266 is turned by means of a lever 267 secured thereto which lever is moved by link 268 whose motion in a given cycle is first upward and then downward. The lower end of link 268 is pivotally connected to lever 269 (Fig. 27) loosely mounted on stud 270, said stud projecting from the frame. The means for giving an upward and downward motion to link 268 in the second, fourth, and fifth machine cycles of the accounting operation will now be described.

On shaft 206, which rotates once for each machine cycle of operation, as has been shown, is securely mounted a face grooved cam 281 which, through link 282 and the cam follower stud 283 attached thereto and held against the cam by the bifurcated rear end of link 282 engaging a circumferential groove on shaft 206, imparts an oscillation to bell crank lever 284 once each machine cycle through pivot 295, said bell crank lever 284 turning first clockwise then counter-clockwise on stud 277. The other arm of bell crank lever 284 is birfurcated to receive a pin 285 attached to the forward end of link-lever 286 whose rear end is pivoted by pin 287 to lever 269. The link-lever 286 has a fabricated construction, the left and right sides being separated by pins 285 and 287, which pins are riveted to the side plates holding them in spaced position. Near the middle of the link-lever is a third pin 288 running between the side plates of the lever 286. On oscillation of bell crank 284 clockwise, the link-lever 286 is ordinarily forced in a counter-clockwise direction around point 287 and then clockwise to home position. If pin 288 is kept stationary against such counter-clockwise motion, then as pin 285 is forced down the rear pin 287 is forced up, imparting an upward motion to link 268, thus moving the key restoring plate to ineffective position. Spring 280 fastened between pivot 287 and arm 279, fastened to the stud 313, holds link 268 in the down position unless actuated. To hold the pin 288 stationary at the time the auxiliary keys are to be released, a disc cam 289 is secured on shaft 201, before described, which rotates 72 degrees during each machine cycle or 360 degrees for the five machine cycles constituting a complete accounting operation. This cam 289 has raised portions that are positioned to come under pin 288 to hold it stationary against counter-clockwise movement around pin 287 during the second, fourth, and fifth cycles. At such times on clockwise movement of bell crank 284, pin 288 bears on the raised portion of the cam as a fulcrum point causing lever 269 to turn clockwise, thus releasing the auxiliary keys. On the counter-clockwise movement of bell crank 284 the pin 288 bears on a permanently placed stop 290 for a fulcrum. Shaft 201, rotating 72 degrees for each rotation of shaft 206, as will be explained, during the first machine cycle positions the cam 289 for use during the first 30 degrees of the second cycle and so on through the five cycles. Cam 281 performs its functions during the first 30 degrees of each cycle.

On the lower end of the auxiliary key restoring plate 262 is a stud 291 which, when plate 262 moves upwardly to releasing position, causes lever 292, secured to a shaft 293 bearing zero stop pawl 294, to rotate counter-clockwise throwing the zero stop pawl to ineffective position. This throwout of the zero stop pawl is necessary as otherwise the differential latch would break in the zero position if no finger key were depressed causing the auxiliary keys to be ineffective in the second, fourth, and fifth machine cycles when no finger key is depressed. The zero stop pawl is described in the Shipley patent mentioned.

*Translator*

The second condition normally preventing the lowering of the auxiliary keys to effective position is the position of a series of four indented plates 296 (Fig. 29) slidably mounted on studs 263 adjacent to the auxiliary key reset plate 262 (Fig. 27). The raised portions of the indented plates 296 (Fig. 29) of the auxiliary keys engage the pins 264 (Fig. 29) of the auxiliary keys to keep said keys in ineffective position in the same manner as do the raised portions of the auxiliary key reset plate 262. Therefore it is a condition precedent to the lowering of any auxiliary key to effective position that an indented portion of each indented plate 296 and in addition an indented portion of the key restoring plate 262 be in line with the path of movement of pin 264. As the restoring plate 262 releases all the auxiliary keys when in releasing position, it is evident that selective movement of the indented plates 296 shown in Fig. 29 determines which auxiliary key, if any, shall become effective.

These indented plates 296 constitute a translating mechanism whereby patterned perforations representing the old balance may be used to set the differential to corresponding values.

In Fig. 29 the indented plates are shown diagrammatically in a position that will allow the "one" auxiliary key to descend, urged by its spring, provided the auxiliary key restoring plate 262 is in the released position. In Fig. 29 it will be noticed that indented plates I, II, and IV are in the up position on the supporting studs 263 while plate II is in the down position. Reference to the code as set forth in Fig. 17 will show that the perforation of the II position alone represents the number one. When the indented plates II, III, and IV are in the down position and I in the up position the auxiliary key "five" will be allowed to become effective. Reference to the code and the indented plates show this correlation. A plate 296 in the down position represents a perforation in the corresponding code position. The indented translator plates 296 are arranged side by side as seen from the portions of the plates shown in Fig. 5 plate I being on the right side and II, III, and IV arranged in sequence toward the left. There are a set of plates 296 for each keybank.

On the lower end of each indented plate 296 is a rounded notch 297 (Figs. 28 and 29). On stub shaft 298 (Figs. 15 and 28) projecting from one of the frame plates are rotatably mounted four plates 299 (Figs. 15 and 28) held from lateral movement by collars 300. There is a plate 299 associated with each translator plate 296. Rearwardly projecting from each plate 299 is a lug 302 (Fig. 28) fitting into notch 297 of its corresponding translator plate so that rotary movement of plate 299 moves its translator plate 296, a clockwise movement of plate 299 causing a downward movement of translator plate 296 and vice versa. The translator plates are restricted in their motion, by studs 263 and slots 301, to approximately half the distance between adjacent pins 264 of the auxiliary keys. As plates 299 are rotatable only to the extent that lugs 302 can move with notches 297 it follows that plates 299 are restricted in their rotary motion. On the periphery of each plate 299 are two notches 303 and 304 adapted to be engaged by a spring pressed positioning pawl 305. The pawls 305 allow the plates 299 to assume their most clockwise position when engaged in notch 304 and their most counter-clockwise position when engaged in notch 303. A plate 299 can only be in one of the two positions. This means that translator plates 296 must either be in their lowest or highest position and will be yieldingly held there. In Fig. 28 the plates 296 are shown in their lowest position and the plates 299 therefore in their clockwise position. A study of Fig. 29 shows that if all the translator plates are in either the down position or all in the up position, representing respectively all positions perforated and no positions perforated, no auxiliary key will be permitted to descend. The mechanism for setting the translator plates, as will be later shown, functions to move the plates only when there is a perforation. As perforations are represented by the translator plates 296 in the down position, all the said plates must first be in the up position before a selection controlled by perforations can take place. A resetting yoke 306 (Fig. 28) securely mounted on shaft 298 is adapted to turn plates 299 to their counter-clockwise position, when shaft 298 is turned counter-clockwise, by the bail of the yoke engaging projecting shoulders 307 of plates 299. The means for giving the counter-clockwise motion to shaft 298 includes a lever 308 (Fig. 30) pinned to its left end and pivotally connected by link 309 (Figs. 28 and 30) to plate 310 (Fig. 30) which is rotatably mounted on stud 311 projecting from the frame of the machine. On frame supported stud 313 (Fig. 30) is a second plate 312 similarly mounted. Plates 310 and 312 are geared together for oscillatory motion as shown at 314. On plate 312 are pinned two rollers 315 and 316. 315 projecting to the right and 316 projecting to the left, adapted to act as followers for a double plate positive drive cam 317, one disc plate cooperating with roller 315 and the other plate cooperating with roller 316. The cam 317 is secured to shaft 206 which makes one rotation for each machine cycle. Cam 317 actuates plate 312 between the 170th and 230th degrees of machine cycle, rocking it first clockwise and then counter-clockwise. Plate 310 is therefore rocked first counter-clockwise and then clockwise, which first lowers link 309 and then raises it, causing the translator plates to be reset at about the 200th degree of each machine cycle. On the upward movement of link 309, the resetting yoke 306 (Fig. 28) is moved to extreme clockwise position to avoid interference with the setting of the translator plates. It will be shown that the transmitter for conveying the data picked up by the old balance pickup mechanism to the translator plates starts to operate at approximately the 220th degree of each machine cycle after the translator plates have been reset. Next will be described the mechanism for picking up the old balance and transmitting it to the translator plates.

*Old balance pickup mechanism*

Referring to Fig. 2 there is shown directly to the rear of the right frame of the comparator a similar frame with side plates 336 (Figs. 2 and 16) fastened together by cross piece 337, the lower ends of the side pieces being bifurcated to straddle circumferential grooves in stud 338. The upper end 339 of the left side piece ends in a hook to engage a circumferential groove in stud 340 (Figs. 2 and 16), this construction allowing vertical movement of the rack on the studs and preventing lateral movement.

Provision has been made for raising and lowering this frame once during the first machine cycle of the accounting operation between the 170th and 230th degree of said cycle. Projecting from both the right and left sides of the frames 336 are studs 341 each engaged by a bifurcated lever 342 pinned to a shaft 343 journaled in the framework. To the left end of shaft 343 is pinned a lever 344 (Fig. 15) and between the outer end of lever 344 and the upper arm of bell crank lever 345 is pivoted a connecting link 347. Clockwise movement of bell crank 345, which is rotatably mounted on a frame supported stud 346, will cause the frame 336 to be lowered and counter-clockwise movement of the bell crank will cause a return of the frame to home position. Pinned on shaft 206 heretofore described, and which rotates once for each machine cycle, is a positive action double plate cam 348. A plate 349, rotatably mounted on a frame supported stud 313, carries roller cam followers 351 and 352, one for each disc. The cam is so designed as to give the plate 349 a clockwise then a counter-clockwise movement during each machine cycle. Between the rearward extending arm of bell crank 345 and plate 349 is a link 352 formed of two spaced side pieces fastened together with pins 353 at either end, said pins also acting as the pivotal connection of the link 352 with the bell crank lever 345 and plate 349. In the middle of link 352 is a third pin 354 extending between the sides, which normally bears against a stop 355 riveted to one of the frame plates of the machine. Pinned on shaft 201 is a disc cam 356 having one raised portion 357 adapted at one of the stops in its rotation to engage pin 354. Shaft 201 is turned 72 degrees in each machine cycle. On shaft 206 is pinned a locking wheel 358 for a Geneva wheel 359 pinned on shaft 201. The Geneva wheel 359 has five positions and is unlocked and turned once for every rotation of locking wheel 358. As shaft 206 makes one rotation per machine cycle then shaft 201 and cam 356 turn 72 degrees in each machine cycle. The position of the cam 356 (Fig. 15) is shown as at the beginning of an accounting operation. During the first half of the first machine cycle of the accounting operation, the cam 356 turns counter-clockwise to engage pin 354 holding it against stop 355. Pin 354 will then act as a fulcrum point when plate 349 is rocked clockwise, raising the rear end and lowering the front end of link 352, which in this cycle of operation acts as a lever. The counter-clockwise motion of the accounting lever 352 around pin 354 causes bell crank lever 345 to rock clockwise, drawing link 347 to the rear, rocking shaft 343 clockwise and thus lowering the frame 336. On the 210th degree of the first machine cycle of the accounting operation, plate 349 rocks counter-clockwise, link-lever 352 rocks clockwise using stop 355 as a fulcrum, and bell crank 345 is rocked counter-clockwise, restoring the frame 336 to raised position. During the second machine cycle of the accounting operation, cam 356 moves counter-clockwise 72 degrees out of engaging position with pin 354 before plate 349 rocks clockwise, whereupon, pin 354 having no fulcrum, the link 352 turns around pin 353 as a center without acting to lower and raise the frame. As the raised portion 357 of cam 356 comes to engaging position with pin 354 in the first machine cycle only, it follows that only in that cycle will the frame 336 be lowered and raised.

As before explained, the carriage for the record material moves during the first machine half of the first cycle of the accounting operation to a position where the part of the ledger card on which the old balance is perforated, is directly under the old balance pickup sensing pins 360 (Figs. 15 and 16) carried by feeler plates 361 (Figs. 15 and 16). The feeler plates 361 and sensing pins are constructed the same as those on the comparator with the exception of a shoulder 601 (Fig. 30) the function of which will be explained later. These feeler plates are eight in number, four representing the digits in the lower order of numbers and four representing the digits in the higher order of numbers. Fig. 16 shows the feelers identified by roman numerals corresponding to the code positions represented in Fig. 17. Fig. 16 shows the old balance pickup mechanism viewed from the rear, the four feelers on the right representing the higher order of digits and the four on the left the lower order of digits. As in the comparator, when the feeler plates are set by the record material the plates left in normal position represent those whose sensing pins encountered perforations. Decoding by the code in Fig. 17 the number represented by the position of the feelers in Fig. 16 is "66" the postions shown having no relation to the sample records shown in Figs. 3 and 4.

The feeler plates 361 are mounted by means of elongated bifurcations 371 and 372 (Fig. 15) on rods 373 and 374, spacing grooves thereon preventing lateral movement of the plates. A lever retaining pawl 377 is supplied for each feeler plate. These retaining pawls are rotatably mounted on the rod 378 connecting the side plates of the frame 336 and are separated by spacing collars 379 (Fig. 16). Individual springs 380 (Fig. 15) tend to rotate the retaining pawls in a counter-clockwise direction. A yoke 381 rotatably mounted on the tie rod 378 (Figs. 15 and 16) and held in position by a link 382 (Fig. 15) which is pivoted to a normally stationary lever 383, opposes the counter-clockwise motion of the retaining pawls and holds them in normal position. The lower ends of said pawls are moved yieldingly toward the front of the machine as a plate makes an upward movement in its frame. Hooks at the lower end of the retaining pawls engage steps 385 on the feeler plates, due to the tension of springs 380, when any of the feeler plates are in the raised position. Each feeler plate is held yieldingly in its down position in the frame by individual spring 386. If yoke 381 is moved clockwise, the retaining pawls release the raised and caught feeler plates, allowing springs 386 to draw them down to normal position. If, now, the frame 336 is lowered to pick up the old balance, the feelers encountering non-perforated record material will be pushed up in the frames and retained there by the retaining pawls. The frame may then be raised and the feeler plates are held in differential positions imposed by the patterned perforations in the ledger card.

To reset the feeler plates to normal, a clockwise motion of the yoke 381 is given to release the retaining action of the pawls 377, after which the yoke is moved counter-clockwise. This movement of the yoke to reset the feeler plates commences at the 32d degree of each machine cycle and ends in home position by the 160th degree of each cycle. The feeler plates are set by being lowered to the record material later in the first machine cycle. Link 382 is pivotally connected to lever 383 pinned to shaft 384. The movement of shaft 384 (Fig. 15) to accomplish this resetting operation is given by a double plate positive drive cam 387 (Fig. 28) pinned to the main drive shaft. A forked lever 388 rotatably mounted on a stud 389 bears roller cam followers. The cam 387 is designed to move the lever 388 first counter-clockwise then clockwise in the first half of each machine cycle. This movement is communicated to shaft 390 by means of link 391 pivoted to lever 392 pinned to said shaft. Also pinned to shaft 390 is a lever 393 which is therefore given a clockwise, then a counter-clockwise motion. Pinned to the left end of shaft 384 is a lever 394 connected by a pivoted link 395 with lever 393. As lever 393 oscillates first clockwise, link 395 moves forward causing shaft 384 to turn clockwise which motion through lever 383 and link 382 heretofore described resets the feeler plates. As lever 393 completes its oscillation, yoke 381 returns to home position. The restoring motion of yoke 381 occurs every machine cycle although the feelers in the old balance pickup are set only in the first and fourth machine cycles necessitating resetting only in the second and fifth machine cycles. The remainder of the resetting motions are idle. The setting of the feeler plates 361 in the fourth machine cycle will be discussed when the process of transferring the new balance to the rear totalizer is described. The transmitting of the old balance pickup setting to the translator plates will next be discussed.

Transmitter

Referring to Fig. 15 it will be seen that each feeler plate of the old balance pickup mechanism has, extending rearwardly, a step 396 and that the position of each feeler plate whether raised or lowered may be judged according to whether its step is in the raised or lowered position.

The transmitter, which conveys the position of each feeler plate in the old balance pickup mechanism to the translator plates 296, consists of a lever 397 (Figs. 14 and 15) for each of the two gangs of feeler plates, a hub 398 for each lever 397 on which each is rotatably mounted, a shaft 399 on which the hubs are secured, a corresponding lever 400 for each lever 397, said levers 400 extending rearwardly, individual hubs 398 on which each lever 400 is rotatably mounted said hubs 398 being secured on shaft 399, a yoke 402 for each set of levers 397 and 400, plates 403 secured to the shaft 399 to which the yokes 402 are fastened, springs 404 holding each lever 397 and 400 in yielding contact with its yoke, and shafts 417 and 418 for connecting levers 397 with their corresponding levers 400.

The problem involved is to transmit a coded number from the four feeler plates representing a certain numerical order or keybank to the translator plates of the differential representing the same order and keybank, the differentials in lateral disposition in the machine being spread out while the feeler plates are crowded together to correspond to closely grouped perforations on record material.

Shaft 399 (Fig. 14) is shiftable laterally in bearings 405 and is also rotatable. The lateral movement of said shaft is supplied under positive control by roller cam follower 406, pinned to shaft 399, moving in a circumferential groove 407 in drum cam 408. This cam secured on a rotatable shaft 410 is shown in Fig. 14 in the rest position. At the 220th degree of each machine cycle the drum cam turns in a counter-clockwise fashion looked at from the right side, making one complete rotation in each of the five machine cycles of an accounting operation. At rest, the shaft 399 is in the extreme left position as illustrated in Fig. 14. Dividing into degrees the drum cam's circumference, the groove 407 during the first 30 degrees of the cam's rotation forces the shaft 399 to the extreme right position, said movement being exactly that required to shift levers 397 across four feeler plates from the IV plate to the I plate in their respective groups. The rotation from the 30th to 90th degree of the circumference of cam 408 causes no lateral motion to shaft 399. From the 90th to the 120th degree the shaft is moved to the left sufficient to move the levers 397 to the II plate. The shaft remains laterally stationary from the 120th to 180th degree on the cam. From 180th degree to the 210th degree the shaft moves to the left again so levers 397 are opposite the III plate, then no movement until the shaft is moved between the 270th and 300th degree to the extreme left so levers 397 are opposite the IV plate. During the periods when levers 397 are not in lateral motion, namely the next 60 degrees of rotation of cam 408 after the 30th, 120th, 210th, and 300th degree, the shaft 399 is rocked counterclockwise then clockwise, as viewed from the right, by means of positive drive double plate cam 409 (Figs. 14 and 28) which is secured to shaft 410 as is cam 408 (Fig. 14). Cam followers 411 (Figs. 14 and 28) are rotatably mounted on studs extending from the ends of bell crank lever 330 (Fig. 28) pinned to shaft 399. The cam followers are also slidably mounted on their supporting studs to allow for the lateral motion of shaft 399.

The means for rotating cam shaft 410 is shown in Fig. 15. Shaft 70 rotating twice each machine cycle, as has been explained, has pinned to it a gear 69 driving gear 67, pinned to shaft 68, once every machine cycle of operation. Near the left end of shaft 68 is pinned gear 100 (see also Fig. 5). Gear 412 rotatably mounted on stud 413 projecting from the frame is driven once every machine cycle by gear 100. Hubbed to gear 412 is a mutilated gear 414 designed to impart intermittent motion to Geneva wheel 415. The Geneva wheel is rotated by the mutilated gear 414 once every machine cycle between the 220th and 360th degree, and is locked in the usual manner by the Geneva stop consisting of a concave projection on the intermittently driven gear 415 and a convex perimeter on the mutilated gear 412.

The shaft 399, as has been shown, by moving bodily the hubs 398, levers 397 and 400, yokes 402 and plates 403, positions levers 397 (Fig. 14) in the plane of each of the four feeler plates it serves, in succession, once each machine operation. Each time the levers 397 stop in the plane of a feeler plate the shaft, as explained, makes a rocking motion on its long axis, turning plates 403 and yokes 402 first counter-clockwise then clockwise, as viewed from the right side. Levers 397 tend to follow the yoke 402 counter-clockwise due to the tension of springs 404. Referring to Fig. 15, it is evident that if a feeler plate is raised, its rearwardly extending step 396 will prevent lever 397 from following the yoke 402. If a feeler plate is in down position, the lever will follow the yoke until its end hits the step. Thus the lever 397, as it moves along its four positions, feels the position of each feeler plate, which if raised causes more relative motion between the hub 398 and the lever 397 than if the feeler plate is in the down position.

It is desired that, whenever there is relative motion between levers 397 and their hubs 398, the levers 400 have the same relative motion, therefore each lever 397 is geared to its corresponding lever 400 in such manner that the movements of levers 397 around hubs 398 positively move levers 400 in the same direction about their hubs, each pair of levers 397 and 400 representing a denomination or keybank having independent movement.

The system of gearing disclosed in United States Patent 1,693,279 issued to Walter J. Kreider is used to achieve the desired paired movement of levers 397 and 400 and consists of internal gearing, which will now be described. Hubs 398 (Fig. 14) are furnished for each lever 397 and 400, making four in all. These are secured on shaft 399. Each hub near the periphery has nine small holes 419 and one large hole 420 whose centers are equally spaced radially and circumferentially around shaft 399. The radii on which the holes of one hub are positioned are aligned with the same radii in the other three hubs. The hubs for each pair of levers 397 and 400 have their large holes 420 in alignment, no two pair being at the same place on the circumference. Two shafts 417 and 418, one shaft representing one denomination or keybank, are inserted through these holes, leaving eight unused holes in each hub. The hubs disclosed, therefore, could accommodate ten shafts or ten keybanks, as there are ten holes in each hub. In this machine, only two pairs of levers being used, representing two amount banks, only two shafts are used. The remaining eight positions illustrate the expansibility of this system to accommodate a machine of more than two keybanks. By using more perimetrical holes the system may be indefinitely expanded depending on the size of the holes and the area of the hubs.

Referring to Fig. 14, the shaft 418 has secured thereon two gears 416 and 424, gear 416 lying within the large hole in the circumference of hub 398 of lever 397 which analyzes the left group of feeler plates, and gear 424 lying in the large hole in the circumference of hub 398 of lever 400 actuating the translator plates for the higher order of numbers. In a similar manner the shaft 417 has two gears 422 and 423 secured thereon connecting lever 397 and lever 404, transmitting the position of the right group of feeler plates to the translator plates representing the lower order of numbers. The inside bearing surface of levers 397 and 400 are toothed to engage the teeth of the gears 416, 422, 423, and 424. Figure 15 showing the hub of lever 400 cooperating with the left group of feeler plates will serve to illustrate the principle of operation of the other internal gears. If either lever 397 is moved in relation to its hub its companion lever 400 will move to the same extent and to the same distance against the urge of its spring 404. Reference is made to the above Kreider patent if further explanation is desired.

The feeler plates 361, levers 397, levers 400, and plates 299 are so positioned that, if upon oscillation of shaft 399, the levers 397 strike raised feeler plates their companion levers 400 will not contact forwardly projecting toes 421 (Fig. 15) of plates 299, whereas if any feeler plates are not raised the companion levers 400 will contact toes 421 on the corresponding translator reset plates 299 turning them clockwise. Clockwise movement of plates 299 lowers the attached translator plates because, as has been explained, the translator plates are reset to the raised position before the 220th degree of each machine cycle. Thus the transmitter analyzes the feeler plates in succession and sets the translator plates accordingly. The translator plates of the two amount banks are set at the same time.

It is apparent by an examination of the code set forth in Fig. 17 that the patterns of the perforations for "nine" and "zero," "one" and "eight," "seven" and "two," "six" and "three," and "five" and "four" are exact opposites. In other words, the digits that are complementary to nine have reverse patterns. This being true, it is only necessary to arrange the translator plates in reverse order upon their studs to have the number picked up by the old balance pickup mechanism entered into a totalizer as the complement of the perforated number.

Adding a deposit

After the passbook and ledger card are placed in the machine, the amount of the deposit is set up on the keys 424 (Fig. 1) and the machine is started by pressing release key 89 (Fig. 6) and turning the crank shaft. If the result of the analysis of the comparing operation justifies the main accounting operation, the first machine cycle of the accounting operation commences and the differentials begin their oscillation by a clockwise movement, the latch 254 (Fig. 1) breaking either on the zero stop pawl 294 (Fig. 27) or upon the stem of a manually depressed key 424 (Fig. 1). The clockwise motion of the differentials is completed by the 120th degree of the machine cycle and the balance totalizer line 425 (Fig. 1) and the rear totalizer line 426 are moved to a position, where the pinions 249 are turned by the ensuing counter-clockwise movement of the differentials, the transfer arms 250 providing for any carry over. The action of the differential being well known, reference is made to the Shipley Patent 1,761,542 for further description. The means for engaging the totalizers and the timing of their engagement will be explained in detail, as it is novel.

Totalizer engaging mechanism

Referring to Fig. 26, studs 425, 426, 427 have rotatably mounted thereon the pinions for the balance totalizer, the rear totalizer, and the front totalizer, respectively. Studs 425, 426, and 427 are supported on arms 428, 429, and 430 (Fig. 23) respectively, said arms being pivotally mounted on studs 431 secured in the vertical frame of the machine. Links 441, 442, and 443 pivotally connected at their outer ends to studs 425, 426, and 427 are bifurcated at their inner ends to straddle individual circumferentially grooved collars 444 loosely mounted on shaft 118. Mounted on shaft 118 and spaced by the collars 444 are three plate cams 445, 446, and 447 designed to actuate links 441, 442, and 443 respectively through stud cam followers 448. Springs 449 extending between the studs 425, 426, and 427 and the frame of the machine pull the totalizers toward the shaft 118, which inward motion places the totalizer pinions in engagement with the differentials. The cams 445, 446, and 447 hold the totalizers in disengaged position by forcing links 441, 442, and 443 outwardly against the tension of the springs 449 except when the totalizers are to be actuated, whereupon, due to the position of said cams, the springs 449 are allowed to function. Whenever one of the studs 448 encounters a low place on its cam, that totalizer is drawn toward the center 118 and engaged with the differential. Secured to the left end of shaft 118 is a Geneva wheel 450 rotated 36 degrees every half machine cycle, making, for the five machine cycles of the accounting operation, ten intermittent motions. Mounted on the main drive shaft 61 is the driver 451 having two arms disposed with an internal angle of 172 degrees each bearing a stud and turning a complete rotation with the main drive shaft each cycle, causing the movement of the Geneva wheel 450 between the 132d and 172d degrees and between the 320th and 360th degrees of each machine cycle. The locking wheel 452 is effective during the remainder of each cycle.

The cam 445 controlling the engaging of the balance totalizer 425 engages said totalizer with the differential during the last half of the first machine cycle of the accounting operation, when the deposit is added therein, during the last half of the second machine cycle when the old balance is added therein, and during the first half of the fourth machine cycle when it is reset.

The cam 446 controlling the rear totalizer 426 engages it with the differential during the last half of the first machine cycle of the accounting operation when the deposit is added therein and during the last half of the fifth machine cycle when the new balance is added therein.

The cam 447, controlling the engaging of the front totalizer, engages said totalizer with the differential during the last half of the second machine cycle when the old balance is added therein, simultaneously with its addition into the balance totalizer.

The totalizer engaging links 441, 442, and 443 each has pivoted on the outer end an alining and locking pawl 453 designed to keep the totalizer pinions from rotating except when engaged with the differential. Springs 454 yieldingly hold the pawls in engagement. Rearwardly extending portions of these alining pawls carry pins 455 each adapted to be engaged, when said totalizers are in engaged position, by one arm of a three armed lever 456, rotatably mounted on shaft 118. The three armed lever is rotated clockwise slightly by cam 457 against the tension of spring 458 tending to turn said lever counter-clockwise. The three armed lever is turned clockwise between the 165th and 202d degree of each machine cycle and remains turned until the 290th degree, when it returns counter-clockwise to home position. The differentials during the releasing motion of the totalizer wheel aliner are at rest in the clockwise position and those totalizers, which are to engage the differentials during the last half of the machine cycle, have been drawn into engaged position. The cam 457 operating against roller stud 459, which stud projects from the arm 456 operating the aliner for the front totalizer line, is secured on the main drive shaft 61, which rotates once for each machine cycle. The arms of lever 456 are just long enough to reach the pawls 455 when a totalizer is engaged, thus keeping locked the unengaged totalizers.

It is apparent that inasmuch as the balance totalizer is in engagement during the first half of the fourth machine cycle of the accounting operation, and the totalizer aliner release does not act ordinarily until the last half of the cycle, a special totalizer aliner release is necessary for this operation. This is shown in Figs. 24 and 25, which also disclose a means for securely holding the balance totalizer in engagement with the differential during the resetting operation.

Projecting from the frame of the machine is shaft 266 (Figs. 24 and 25) upon which is rotatably mounted a bell crank lever 461. On a shaft 462, rotatably mounted in the frame, is pinned a lever 463. Also pinned to shaft 462 is a lever 464. To lever 464 is pivotally connected a link 465 oscillated down and up once during the five machine cycles of the accounting operation. The lower end of link 465 is slotted to engage a circumferential groove in shaft 118, heretofore mentioned. On shaft 118 is a double plate positive drive cam 466. Shaft 118 rotates once for each five machine cycles comprising the accounting operation and in so doing the cam 466 acting on roller studs 467 and 468 forces link 465 downward starting at the 320th degree of the third machine cycle and upward starting at the 132d degree of the fourth machine cycle. The downward motion of link 465 rotates shaft 462 slightly counter-clockwise causing lever 463 to do the same. One end of lever 463 has a bifurcation 469 (Fig. 25) engaging a stud 470 on lever 461 in such a fashion that counter-clockwise movement of lever 463 moves lever 461 clockwise causing its forward projecting foot to come to rest on stud 425 (Fig. 25) shortly after the totalizer has been lowered to engaged position with the differential. The totalizer in all other engagements is held in mesh with the differential by springs 449. In the reset operation where the long teeth of the pinions are stopped by the arm 471 (Fig. 23) the totalizer pinions tend to be jolted out of mesh with the differential, making necessary the positive locking of the pinions in mesh and therefore the above described locking lever 461 is provided. Bell crank lever 463 at the same time cams the aliner 453 to unlocked position through action on pin 438 (Figs. 24 and 25).

The means by which the pinion teeth striking against the arm 471, during the reset operation, breaks the differential latch is well known in the art and the Shipley United States Patent 1,761,542 is given as reference for further explanation. The reset arms 471 (Fig. 23), normally inactive and in ineffective position are thrown into the path of the long teeth on the totalizer pinions by the same shaft 462 which locks the totalizer line in mesh during the reset operation, the timing therefore coming from cam 466 (Fig. 24) as has been described.

*Printing mechanism*

The differential positioning of the actuators 247 (Fig. 1) is transmitted to the printing elements by means of beams 473 pivoted on said actuators at 474. The beams 473 at their rear ends are bifurcated to embrace studs projecting from links 476, the upper ends of which links are pivoted to alining and locking segments 477 rotatably mounted on a shaft 440 journaled in the framework. The lower ends of links 476 are pivoted at 439 to segment plates 478, said segment plates being rotatably mounted on shaft 479 journaled in the framework. Segments 478 drive segments 480 through links 481 said links 481 being pivoted at either end to the segments they connect. Segments 480 are rotatably mounted on shaft 482.

After the actuators 247 have been positioned by the keys or by the totalizer pinions, rollers 436 carried by the levers 243 engage the lower edges of the beams 473, forcing the upper edges of the beams against hubs 246. This, by means of the links 476, positions the segments 478 and 480 commensurate with the position of the actuators 247. The segments 480 position the printing mechanism and translating mechanism for the perforator.

The locking of the links 476 and segments 478 and 480 in accurate position by the segments 477 is accomplished by means of alining pawls 484 engaging teeth on the segments 477, said pawls being pinned to shaft 390 which rocks clockwise on the 32d degree of each machine cycle and which rocks counter-clockwise on the 135th degree of each machine cycle. The movement of shaft 390 has previously been described in connection with the restoring of the feeler plates in the old balance pickup mechanism, as controlled by cam 387 (Fig. 28).

There is a differentially set segment 480 for each of the two keybanks. Because they must actuate two sets of closely positioned printing wheels, one for the ledger card and one for the passbook, a means is provided for the lateral transmission of the positioning of segments 480 to associated printing wheels.

The ledger card printing wheel 487 (Fig. 40) for the higher order of figures is the only one of the printing wheels that is in the same operative plane as its actuating segment. The segment 480 shown in Fig. 1 is positioned by the higher amount bank and drives a gear 483 which gear in turn drives printing wheel 487 (Fig. 40). Gear 483 is rotatably mounted on a hub 485 bearing perimetrical holes and hub 485 is secured to a shaft 486. The shaft 486, journaled in the framework (Figs. 1 and 40) has mounted thereon three other hubs in line with the three printing wheels 493, 497, and 571, said hubs bearing gears 490, 492, and 491 respectively. The segment 480 for the right bank of keys representing the lower order of numbers drives gear 489 (Fig. 40). By means of an internal gearing system such as is disclosed in connection with the transmitter and further described in United States Letters Patent 1,693,279 issued to Walter Kreider, gear 489 drives gears 490 and 492 which in turn position the printing wheels 493 and 497. Gear 483 positions gear 491 which in turn positions the printing wheel 571. As the hubs of gears 483, 489, 490, and 491 bear a plurality of extra holes, only two being used in this particular machine to accommodate shafts 495 and 499, this transmission system is expansible to accommodate a greater number of keybanks, limited only by the number of holes that may be bored in the periphery of the hubs. Shaft 499 connects together gears 489, 490, and 492 through pinions 498, 500, and 501, and shaft 495 connects gears 483 and 491 together through pinions 494 and 496. As this method of duplicate printing is not new, reference is made to British Letters Patent 447,481 issued to The National Cash Register Company and to United States Letters Patent No. 2,141,332, granted December 27, 1938, to Charles H. Arnold, for further explanation if desired.

*Printing hammer mechanism*

The printing hammer and its operating mechanism for the ledger card are shown in Figs. 1 and 2. Loosely mounted on stud 502 (Fig. 1) is a forwardly extending arm 503 (Figs. 1 and 2) to which is fastened the printing hammer 504 (Fig. 2), said hammer being wide enough to cover both type wheels 487 and 493 (Figs. 21 and 40). The ledger card carriage has in its floor an opening 505 (Fig. 22) through which the printing hammer may strike the ledger card, carrying it with an impact against the type wheels. Between the type wheels and the card is stretched an inked ribbon 506 (Fig. 1) supported by rollers 507 (Figs. 1 and 2) and kept taut by an idling roller 508 (Fig. 1).

Between arm 503 and shaft 509 (Figs. 1 and 2) is a toggle joint composed of a link 510 pivoted to arm 503 and also to lever 511 which is pinned to shaft 509. Lever 511 has a downwardly extending arm from the side of which projects a stud 512 (Figs. 1 and 2) adapted to be engaged by a hook 513. When stud 512 is drawn rearwardly, the hammer is forced against the ledger card and type wheels, thus making an impression. The hook 513 has a rearward movement once every machine cycle, but in only three out of its five rearward movements during an accounting operation is it engaged with stud 512, these three effective rearward movements occurring near the end of the first, second, and fourth machine cycles, the deposit being printed during the first cycle, the old balance being printed in the second cycle and the new balance being printed in the fourth cycle.

The hook 513 (Fig. 1) is on the forward end of arm 514, which is pivoted at its rear end to bell crank lever 515 pivoted on stud 516. On either arm of the bell crank lever 515 are rollers 517 which are followers for the double plate positive drive cam 518. Cam 518 is pinned to shaft 206 which as previously noted makes one rotation for each machine cycle. The normal position of arm 514 during the forward and backward motion caused by cam 518 is with the hook 513 disengaged from stud 512. Means has been provided for causing the front of arm 514 to raise slightly before its rearward movement in each cycle, engaging stud 512. During the first, second, and fourth machine cycles of the accounting operation the hook 513 is kept engaged with the stud 512 while arm 514 has its rearward movement, and during the third and fifth machine cycles the hook is disengaged from stud 512 before the rearward movement of arm 514 occurs. Pivoted to arm 514 is link 519, the other end of which is pivoted to lever 520. Lever 520 is rotatably mounted on stud 521. Clockwise motion of lever 520 raises hook 513 to engaging position with stud 512 and counter-clockwise motion causes hook 513 to become disengaged. Also rotatably mounted on stud 521 are two levers hubbed together forming a bell crank lever 522 whose forward extending arm bears a stud 523 positioned to engage the lever 520 and turn it clockwise when the bell crank lever 522 itself is turned clockwise. The rearwardly extending arm 531 of bell crank lever 522 is pivoted to link 523 whose rear end is bifurcated to straddle shaft 206 and which bears a stud 524 adapted to engage a cam groove in the face of cam 525, said groove imparting one forward and backward oscillation to link 523 each machine cycle between the 17th and 170th degrees of each cycle. This causes the hook 513 to raise into engaged position and then under influence of spring 528 to drop back to normal position, except in the first, second, and fourth machine cycles, when cam 526 (Fig. 1) locks the hook in engaged position. Cam 526 is pinned to shaft 201 which is turned 72 degrees each machine cycle in a counter-clockwise direction by Geneva wheel 359 (Fig. 15) as before explained. The high points on the periphery of cam 526 (Fig. 1) are positioned to engage stud 527 when the counter-clockwise impulse is given lever 520 by spring 528, and prevents lever 520 from so turning, thus keeping the hook 513 engaged with stud 512. When a low part on the periphery of cam 526 is opposite stud 527, the hook 513 will be pulled down by action of spring 528.

Shaft 509 (Figs. 2 and 21) turning with lever 511, has a similar lever 529 (Fig. 21) pinned to it which actuates a toggle joint and printing hammer 530 for the passbook printing. As the printing hammer arm, hammer, passbook carriage, inked ribbon and type wheels for the passbook are of the same construction as those for the ledger card, description of them is not necessary. Both ledger card and passbook are therefore printed at the same time with the same data.

The mechanism operating the printing hammers is not new and is more fully described in British Letters Patent 447,481 issued to The National Cash Register Company, and in United States Letters Patent No. 2,141,332 granted to Charles H. Arnold, to which reference has been previously made.

*Perforation of ledger card and transfer of new balance to rear totalizer*

During the first half of the fourth machine cycle of the accounting operation the balance totalizer is reset, resulting in the differentials 247 (Fig. 1) and the beams 473 being set accordingly and thus positioning the differentially set gears 489 and 483 (Figs. 1 and 40) through links 476 and segments 479 and 480. At this point in the operation of the machine the new balance is stored in these differentially set gears. In addition to setting the printing wheels the gears 489 and 483 have a further function in differentially setting gears 541 and 542 (Figs. 30 and 34) each rotatably and independently mounted on a shaft 543 (Figs. 30 and 33) said shaft being mounted in vertical slots 546 in the side plates 544 (Figs. 30, 33, and 34) of a cradle, said side plates being joined by tie rods 545 (Fig. 33). To each of the two gears 541 are hubbed four indented discs, each set of four discs being similar in pattern and arranged on the hubs in the same sequence. These discs are for translating settings of the differentially positioned gears 485 and 489 so perforations of the new balance may be made on the ledger card and so the old balance pickup plates may be set to store and to transfer the old balance in the next cycle of the accounting operation as will be explained.

These discs designated in Fig. 34 by Roman numerals are patterned for the code in Fig. 17, requiring four positions to represent a number, which accounts for the four discs for each numerical order. A set of these discs is shown in Figs. 35, 36, 37, and 38, the Roman numerals indicating the position in which they are hubbed on the shaft 543, which is shown in plan view in Fig. 34 and in elevation from the rear in Fig. 31. The movement of gears 483 and 489 (Figs. 30 and 40) in moving the printing wheels from "zero" through "nine" is just sufficient to move the gears 541 and 542, together with their discs, 135 degrees in a clockwise manner, 15 degrees of the periphery of the discs, therefore, serving to represent a number. As these indented discs cam with their bottom edges the perforating punches 547 (Figs. 35, 36, 37, and 38) and cam the old balance pickup feeler plates 361 (Fig. 30) with their top edges, through slides 599, the diametrically opposite places on the discs are cut to represent the same data. The portions of the discs camming the slides 599 is represented in Figs. 35, 36, 37, and 38 by the words "transfer total" while that portion of the discs camming the punches is represented by the word "punch." The numerals 0, 1, 2, 3, 4, 5, 6, 7, 8, 9, show the portions actuating the punches and feeler plates when the differential is set to those numbers. The portions of the discs numbered beyond the decimal range is available for representing any other required symbols.

In discussing the old balance pickup mechanism it was shown that where perforations were present in the ledger card the corresponding feeler plates were left in the lower position and where there were no perforations the feeler plates were left in the raised position. In using the discs to position the feeler plates 361 the high places on the discs are intended to raise the feeler plates and the low places on the discs are intended to leave the feeler plates in the low position. An examination of the discs will show that the portions representing the zero are in effective position.

The discs are given six motions in the fourth and fifth machine cycles of an accounting operation. In the first motion the cradle 544 (Fig. 33) is moved slightly forward to disengage the gears 541 and 542 (Figs. 30 and 34) from the gears 483 and 489 (Figs. 30 and 40), this occurring between the 133d and the 170th degrees of the fourth machine cycle. In the second motion the discs are oscillated up and back to rest position to cam the feeler plates, this occurring between the 170th and 230th degrees of the fourth cycle of the accounting register. In the third motion the discs are moved to the rear to again engage the gears 541 and 542 with the gears 483 and 489, this occurring between the 240th and 285th degree of the fourth machine cycle. In the fourth motion the gears 541 and 542 are again disengaged from gears 483 and 489 by forward motion, this occurring between the 133d and 170th degrees of the fifth cycle of the accounting operation. The fifth motion is an oscillation down and up to rest position to cam the punches, this occurring between the 170th and 230th degrees of the fifth machine cycle. The sixth motion is to the rear to again engage the gears 541 and 542 with the gears 483 and 489.

In Figs. 33 and 34 is shown the means for supporting and moving the cradle 544 back and forth to disengage the gears 541 and 542 from gears 483 and 489 (Fig. 30). Journaled in the vertical frame plates of the machine is a shaft 549 (Figs. 33 and 34) which extends through holes 550 in the side plates 544 of the cradle, said holes being elongated to allow the cradle forward and backward motion. Loosely mounted on shaft 549 is a yoke 551 the end pieces of which perform the function of plate cams coacting with roller cam followers 552 which are mounted on studs extending from the side plates 544. Rocking the yoke clockwise slightly forces the cradle to the rear engaging the gears 541 and 542 (Fig. 34) with gears 483 and 489 (Figs. 1 and 30), and rocking the yoke counter-clockwise forces the cradle to the forward, disengaged, position. On the lower edge of the left end piece of yoke 551 (Fig. 33) are cut teeth 553 (Figs. 30 and 33) engaging teeth on a sector 554 pinned to shaft 555 which is journaled in the frame. A lever 556 (Fig. 33) also pinned to shaft 555 is pivotally connected by link 557 with the upper extending arm of a bell crank lever 558 pivoted on stud 346. Bell crank lever 558 when in rest position can only move yieldingly in a clockwise fashion, being prevented from turning counter-clockwise by stud 560 and being held against stud 560 by spring 561. When the gears 541 and 542 are to be disengaged from the actuating gears 483 and 489, by a forward movement of the cradle, the bell crank lever is given a clockwise movement which draws link 557 to the rear and turns shaft 555 clockwise which acts to turn yoke 551 counter-clockwise producing the desired result. Fastened to shaft 206 which, as has been explained, rotates clockwise once each machine cycle, is a double plate positive action cam 562 and on stud 313 is a plate 564, rotatably mounted, bearing cam followers 565. Plate 564 is given first a clockwise then a counter-clockwise movement during one machine cycle. Connecting the bell crank lever 558 and plate 564 is a link 566 composed of two side plates spaced apart by rivet studs 567 at either end and the middle. The forward end of link 566 is pivotally connected to the rear arm of bell crank lever 558. The stud in the rear end of link 566 engages a bifurcated extension of plate 564. On shaft 201 is pinned a disc cam 568 which has a raised sector designed, when opposite the middle stud 567 in link 566, to act as fulcrum, turning link 566 into a lever as plate 564 makes its clockwise movement. The shaft 201, as previously shown, makes one fifth of a rotation on each of the five machine cycles of the accounting operation. The raised sector on cam 568 is adapted to engage the middle stud 567 only during the oscillations of plate 564 occurring in the fourth and fifth machine cycles. During the first, second, and third machine cycles the oscillations of plate 564 cause link 566 to turn idly around its forward pivot. On clockwise movement of plate 564 during the fourth and fifth machine cycles, link-lever 566 turns counter-clockwise around stud 567 causing bell crank lever 558 to turn clockwise with the result before mentioned. On the counter-clockwise motion of plate 564 spring 561 is allowed to return bell crank 558 to its normal position. As the gears 541 and 542 (Fig. 34) become disengaged from gears 483 and 489, by forward motion of the cradle, they are locked against accidental turning by a wedge shaped rod 569 (Figs. 30 and 34), secured between two arms 570 (Figs. 30 and 34) pinned to shaft 549, toward which the teeth of gears 541 and 542 move. The arms 570 do not move forwardly and backwardly with the cradle.

The rearwardly extending arms 570 are bifurcated and engage shaft 543 which can be raised or lowered in slots 546 (Fig. 33) by turning shaft 549 (Figs. 30 and 33) slightly counter-clockwise or clockwise.

Pinned to shaft 549 (Fig. 30), to the left of the cradle, is an arm 581 extending rearwardly whose rear end is toothed to engage teeth on the forwardly extending end of arm 582 of a three armed lever 583 pivotally mounted on stud 346. Clockwise rotation of lever 583 will cause shaft 549 to rotate counter-clockwise and raise arms 570, counter-clockwise rotation of lever 583 causing shaft 549 to rotate clockwise and lowering arms 570. The normal position of shaft 543 being midway between the high and low position, bifurcated retaining lugs 584 (Figs. 33 and 34) fastened to the frame 62 receive the ends of shaft 543 when the cradle is in forward position. Studs 585 forming part of the lugs 584 are embraced by bifurcations in the rear of side plates 544 for further support of the cradle.

For rocking the three armed lever 583 (Fig. 30) clockwise, in the fourth machine cycle of the accounting operation, to transfer the new balance from the discs to the feeler plates 361 (Fig. 34) and to rock the same lever counter-clockwise in the fifth machine cycle to perforate the new balance on the ledger card, the motion of cam 317 (Fig. 30) and plates 310 and 312, heretofore explained in connection with resetting the translator plates, is used. The plate 310 oscillates counterclockwise then clockwise between the 170th and 230th degree of each machine cycle, plate 312 having the reverse motion. Pivoted to arm 586 of lever 583 is a link 587 composed of two side plates spaced apart with rivet studs 588, 589, and 590 the forward stud 588 acting as a pivot, the rear stud 589 engaging a bifurcation in plate 310, and the middle stud 590 adapted to be engaged by point 591 of cam 580 and stop 592. The other arm 593 of lever 583 is pivoted to a link 594 similar to link 587 the rear end of which is provided with a stud 595 to engage a bifurcation in plate 312 and a middle stud 596 adapted to be engaged by point 597 of cam 580. Cam 580 is pinned to shaft 201 which as has been explained turns 72 degrees between the 65th and 130th degrees of each machine cycle. The cam 580 as shown in Fig. 30 is in the position taken after the 130th degree of the fifth machine cycle of the accounting operation, where it remains until the 65th degree of the first cycle in a subsequent accounting operation of the machine. As cam 580 turns 72 degrees at a time, point 591 never comes to rest opposite stud 596. For the same reason, point 597 never comes to rest opposite stud 590 although in the fourth machine cycle it is opposite stud 596. During machine cycles one, two, and three of the accounting operation, a high point is opposite neither stud, so when plates 312 and 310 make their motion in those cycles, link 587 oscillates around stud 588 ineffectively, and link 594 oscillates around stud 598 ineffectively. In the fourth machine cycle, when the motion of plates 312 and 310 occurs, point 597 opposes the counterclockwise movement of link 594 acting as a fulcrum point for link-lever 594, which turns counter-clockwise then clockwise causing lever 583 to turn clockwise then counter-clockwise, which moves the shaft 543 up and then down to middle position. In the fifth machine cycle, point 591 becomes a fulcrum, making link 587 into a lever which turns first clockwise then counter-clockwise, causing lever 583 to do the opposite, which first lowers shaft 543 then raises it to middle position.

*Transfer of new balance to feeler plates*

The upward movement of shaft 543 (Fig. 30) bearing the code discs, eight in number, causes them to strike plates 599, of which there is one for each disc, which transmit the upward motion of the raised portions of the discs to the corresponding feeler plates 361. Bifurcated portions of plates 599 are hooked over tie rods 545 of the cradle, being spaced thereon by collars and held in down position by individual springs 600. Only those discs presenting high points to the plates 599, when their upward movement occurs, are enabled to lift the plates 599 from their rest position. Plates 599 in being raised, while in the forward position, strike shoulders 601 on their corresponding feeler plates 361 raising them to a position where they are caught by their retaining pawls 377 (Fig. 15). The position of the feeler plates is thereafter transmitted, beginning at the 220th degree of the fourth machine cycle of an accounting operation, by the transmitter to the translator plates 296 (Fig. 29) which are left set at the end of the fourth cycle of operation. At the beginning of the fifth machine cycle of an accounting operation the auxiliary key locking plate 262 (Fig. 27) of each keybank moves to release position allowing the selected auxiliary keys to become operative. As the differentials move upward, their latches are broken, the rear totalizer is engaged and the new balance is added into it.

*Perforation of new balance*

In the fifth machine cycle of the accounting operation, when the shaft 543 bearing the code discs is given its downward movement, the high points depress punches 547 (Figs. 35, 36, 37, and 38) there being one punch for each code disc.

The punches 547 are held in alignment, laterally, by individual holes bored in top and bottom plates 602 and 603 (Figs. 33 and 37) extending between the vertical frame plates of the machine. The ledger card 135 (Fig. 33) is carried beneath the plate 603 and a die plate 605 is fastened to the machine frame, so that when the punches are forced down by the code discs they perforate the ledger card with the new balance.

To keep the punches in a normally raised position and to return them to that position after perforating the ledger card, they are each provided with an enlargement 608 in their midsection and suspended in a basket 604 (Figs. 33 and 37) the shoulders of the enlargements keeping the punches from falling through holes in the bottom of the basket but allowing their operative ends to protrude below. The basket is held yieldingly in the raised position so that when a punch is forced downward the basket is carried down, the punches that are not being actuated are also carried down, by gravity, but not forced against the ledger card material so as to perforate it. When the code discs return to raised position the basket is raised by springs 606 (Figs. 31 and 33), of which there is one at either end attached by pivoted links 607 (Figs. 31 and 33). The suspension of the basket is independent of the motion of the code discs. The perforation of the new balance and the adding of it into the rear totalizer complete the five machine cycles of the accounting operation.

Operation

When a transaction takes place the customer presents his passbook to the operator who reads the account number, selects the corresponding ledger card from his files, inserts the record materials on their respective carriages and sets up the amount of the transaction on the amount keys. The machine is then ready for operation which commences as soon as the operator starts the driving means. The complete transaction then proceeds uninterruptedly to a conclusion without further act being required by the operator.

If the operator has mistakenly selected the wrong ledger card, the comparator will cause the machine to stop before the accounting operation begins. The operator then replaces the wrong ledger card with the correct ledger card and starts the machine again.

If the proper ledger card has been inserted, the machine keeps operating continuously until the accounting operation is completed.

At the conclusion of the transaction, as before stated, the passbook and the ledger card have printed thereon the old balance, the new transaction, and the new balance. The ledger card has in addition perforated thereon the new balance.

The few acts required by the operator is one of the chief features of novelty in this disclosure.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, in combination, a beam adapted to be moved from rest position by an unbalanced force applied at either of its ends; a plate at either end of the beam adapted to apply force to the beam and to sense perforations in record material said plates having a rest position and a position to which they are moved when no perforations are sensed; means for oscillating the plates first to sense perforations then to apply force to the beam so as to cause an unbalanced force to be applied to one end of the beam to move it when the data sensed by one plate is dissimilar to that sensed by the other plate; and means for determining the moved or unmoved condition of the beam.

2. In a machine of the class described adapted to perform a record comparing operation and an accounting operation, the combination of a driving means; an accounting mechanism normally idle; a normally disengaged clutch for connecting the driving means and the accounting mechanism; means for comparing identifying characteristics of a plurality of record material; means for urging the clutch to engaged position near the end of the record comparing operation; means for analyzing the condition of the comparing means near the end of the comparing operation; and means for preventing the engagement of the clutch if the analyzing means shows that the record materials have not similar identifying characteristics.

3. In a machine of the class described, the combination of a main driving means; an accounting mechanism; a normally disengaged clutch for connecting the main driving means and the accounting mechanism; with a means continuously urging the clutch to engaged position; a mechanism for comparing identifying characteristics of a plurality of record material; means for independently operating the comparing mechanism by the driving means; means for analyzing the comparing mechanism after its operation; means allowing the clutch to proceed to engaged position after the comparing operation only if the analyzing operation shows that the record materials have similar identifying characteristics; and means preventing the clutch engagement if the identifying characteristics of said record materials are dissimilar.

4. In a machine of the class described adapted to perform a record comparing operation, in combination, a driving means; an accounting mechanism; a normally disengaged clutch for connecting the driving means and the accounting mechanism; with paired gangs of sensing pins for exploring perforations in supposedly paired record materials; means to differentially set individual sensing pins according to whether or not perforations are encountered by them in the record material; beams capable of being oscillated from a normal condition of rest each beam having contact with one sensing pin in each gang; means for causing a beam to move from its rest position if the pins it contacts have sensed a perforation in one of the record materials and not in the other; a bifurcated plate that moves from rest position if any beam is moved from normal; an analyzing lever that is blocked from moving if the bifurcated plate is moved from rest position; a means to urge the clutch to engaged position; and means to prevent the clutch from engagement if the analyzing lever is blocked from movement.

5. In a machine of the class described having a plurality of machine cycles in each accounting operation, and differentially settable means, the combination of a dual keybank composed of manipulative keys and record controlled keys; means normally resiliently holding the manipulative keys individually in ineffective position; means normally urging all of the record controlled keys individually to effective position; means for holding all the record controlled keys in ineffective position except during a portion of certain machine cycles of an accounting operation; and means for holding all but one of the record controlled keys ineffective during the machine cycle when any of them may be effective.

6. In a machine of the class described having a plurality of machine cycles in each accounting operation, the combination of a balance totalizer; a totalizer for accumulating the total of balances; differential racks for entering data into or withdrawing data from the totalizers; a gang of differentially settable plates representing each differential rack; means to set the plates either from record material or from members set differentially by the balance totalizer; means to control the differential racks in accordance with the data on the plates; and control means for causing data withdrawn from the balance totalizer to be stored in the plates in one machine cycle of operation and from there transferred, by means of the differential racks, to the total balance totalizer in a succeeding machine cycle of operation.

7. In a machine of the class described having a plurality of machine cycles of operation, the combination of a balance totalizer and a plurality of special totalizers; a differential rack for entering data into and withdrawing data from the totalizers; means to engage each totalizer with the rack; a link for the differential rack positioned each machine cycle in accordance with data entered into or withdrawn from the totalizers; a gear representing the differential rack and positioned each machine cycle by the link in accordance with data entered into or withdrawn from the totalizers; a plurality of code discs positioned by the gear each machine cycle in accordance with the data entered into or withdrawn from the totalizers; a storage mechanism for data withdrawn from the totalizers; means to transfer data from the code discs to the storage mechanism; and means to set the differential rack in accordance with the data in the storage mechanism, whereby data may be withdrawn from one totalizer and entered into another totalizer.

8. In a machine of the class described having a plurality of machine cycles of operation, the combination of a totalizer; a differential rack operating each cycle for entering data into or withdrawing data from the totalizer; a link for each differential rack positioned each cycle in accordance with data entered into or withdrawn from the totalizer; a gear representing the differential rack positioned each cycle by the link in accordance with data entered into or withdrawn from the totalizer; a plurality of code discs positioned by the gear each cycle in accordance with the data entered into or withdrawn from the totalizer; a plurality of differentially settable plates there being one plate for each code disc; means to differentially set the plates in accordance with the data on the code discs; and means to control the differential racks in the next succeeding cycle in accordance with the data stored in the plates.

9. In a machine of the class described having a plurality of machine cycles of operation, the combination of totalizers; differential racks of operating each cycle for entering data into or withdrawing data from the totalizers; a link for each differential rack positioned each cycle in accordance with data entered into or withdrawn from the totalizers; a gear representing each differential rack positioned each cycle by the link in accordance with data entered into or withdrawn from the totalizers; a plurality of code discs positioned by each gear each cycle in accordance with the data entered into or withdrawn from the totalizers; a plurality of differentially settable plates there being one plate for each code disc; means to differentially set the plates in accordance with the differential setting of the code discs; and mechanism including totalizer engaging means automatically operable in different cycles to cause to be entered into a totalizer by means of the differential racks the data withdrawn from another totalizer and stored between cycles on the plates.

10. In a machine of the class described, in combination, a rack frame; a plurality of plates bearing sensing pins movably mounted in the rack frame; means yieldingly holding each plate in a rest position in the rack frame; means for moving the rack frame towards and away from inserted record material supposed to be bearing data encoded in perforations; and means comprising a spring-actuated pawl for each plate for holding in displaced position any plate whose sensing pin having encountered the record material instead of a perforation therein has been thereby moved from rest position.

11. In a machine of the class described adapted to pick up encoded data from record material, the combination of a plurality of denominational keybanks each having a plurality of manipulative digit keys and a plurality of auxiliary digit keys; a differential actuator associated with each keybank, each of said actuators being controllable by either the manipulative keys or the auxiliary keys; a code translating means for each keybank whereby an auxiliary key may be selected for operation by differential operation of the translating means; a record material sensing unit for each denomination of the keyboard, each of said sensing units being differentially set by encoded data picked up from the record material; and means to sense all the sensing units and transmit the encoded differential data thereon to the respective translation means of all the denominations simultaneously.

12. In a machine of the class described adapted to pick up encoded data from record material, the combination of a plurality of keybanks each having manipulative digit keys and corresponding auxiliary keys; a differential actuator for each keybank controlled by either the manipulative keys or the auxiliary keys; a plurality of code translating devices for each keybank, the differential setting of which translating devices will select an auxiliary key for operation; a sensing unit associated with each keybank, each of said units having a plurality of members settable differentially by encoded data on record material, said members in a sensing unit being equal in number to the translating devices of each keybank; a shaft shiftable and rockable; means to shift the shaft on its axis step by step in one direction and uninterruptedly in the other direction; means to rock the shaft in a complete oscillation after each step by step shifting movement; a plurality of hubs secured on said shaft, there being a hub corresponding to and in operative alinement with each sensing unit and each keybank; a lever rotatably mounted on each hub the bearing surface of said levers having internal gear teeth; an interior gear cooperating with the internal gear teeth on each lever; and rods inserted in perimetrically positioned clearance holes in the hubs and through fitted holes in the interior gears of levers associated with the same keybank so, be they adjacent or non-adjacent on the shaft, they may be moved with a fixed angular relation between them, whereby said step by step movement and the rocking movement of the shaft will through said levers associated with the sensing units feel the encoded data on the sensing units and transmit it to differentially set the corresponding keybank translating devices.

13. In a machine of the class described, whose complete operation consists in part of a record comparing and verification operation, the combination of paired sensing units each equipped with a plurality of elements for sensing a plurality of symbols representing data; oscillating members equal in number to the elements of one of the sensing units, each member being positioned by an associated element in each sensing unit so as to assume a normal position when its associated elements sense the same data from which poition it is moved when its associated elements sense different data; and means moved from a normal position when one of the oscillating members is in moved position thus signifying that the paired sensing units sense different data.

14. In a machine of the class described, the combination of a plurality of groups of elements adapted to sense perforations in a plurality of record materials and to be set according to whether or not perforations are sensed; beams, each of which is associated with correlated elements of the plurality of groups and movable from a normal position when one of its associated elements senses a perforation and another of the associated elements senses no perforation, thus determining the dissimilarity of sensed data; and means to analyze the position of the beams to determine if any are out of position.

15. In a machine of the class described, whose operation consists of a record verification operation preliminary to an accounting operation, the commencement of which accounting machine operation is controlled in the verifying operation, in combination, means causing the machine to perform a verifying operation; a plurality of beams each of which is adapted to be rotatably displaced from rest position by an unbalanced force applied at either end; a plate for each end of each beam, said plates being movable from a rest position to sense perforations and being selectively displaceable in the sensing operation so as to apply force to the beam when returned to rest position; means for oscillating the plates to sense perforations in record material then to apply force to the beams through the displaced plates; means to latch those plates that do not sense perforations in displaced position where they will apply a force to the beams when they are moved to force-applying position whereby an unbalanced force is applied to one end of a beam whenever a perforation has been sensed by one of its associated plates and not sensed by the other of its associated plates; elements positioned by the displaced beams; and means to sense the position of said last mentioned elements to determine whether the accounting operation should be commenced.

16. In a machine of the class described having a balance totalizer, a differential means for entering data into said totalizer, and means to engage the totalizer with the differential means, the combination of manipulative means for controlling the differential means; means controlled by data representations in record material for controlling the differential means; and automatic sequence of operation control means for controlling the engaging means for entering data into the totalizer first under manipulative control and then under record control.

17. In a machine of the class described adapted to perform a record-comparing operation and an accounting operation, the combination of a driving means; a normally idle accounting mechanism including means for recording in duplicate on associated record materials the data involved in the accounting operation; a normally disengaged clutch for connecting the driving means and the accounting mechanism; means for comparing identifying characteristics of the associated record materials in said record-comparing operation; means for urging the clutch to engaged position near the end of the record-comparing operation; means for analyzing the condition of the comparing means near the end of the comparing operation; and means controlled by said analyzing means for preventing the engagement of the clutch and the consequent actuation of the accounting mechanism and its recording means in an accounting operation, if the analyzing means shows that the record materials have not similar identifying characteristics, thereby assuring that the recording during an accounting operation is always made on associated records.

18. In a machine of the class described, a plurality of manipulative devices corresponding to digit values and selectively settable to effective position; means for sensing combinational control representation in record material; translating means controlled by said sensing means for translating said combinational representation into digit values; a plurality of control devices corresponding to digit values and selectively settable to effective position under control of said translating means; and mechanism differentially settable selectively under control of the manipulative devices or the control devices, whichever is in effective position.

19. In a machine of the class described adapted to pick up data from perforated record material, the combination of a plurality of key banks, each key bank representing a denomination and having a plurality of digit value representing control devices; sensing means to explore record material for control perforations thereon, one or more of said perforations, taken selectively, representing digit values; translating mechanism for each key bank comprising a plurality of individually settable elements having means thereon whereby the setting of the elements in various combinations will enable the control devices, having the value corresponding to the combinations, to become effective; and means controlled by the sensing means for simultaneously transmitting the combinations sensed to the translating means for the plurality of key banks and setting the elements thereof.

20. In a machine of the class described operable to perform accounting operations during five continuous machine cycles of operation, the combination of a balance totalizer; auxiliary totalizers; differential means to enter and withdraw amounts from any of the totalizers; means for selectively engaging the balance totalizer and the auxiliary totalizers with the differential means; manipulative keys to control said differential means; auxiliary keys to control said differential means; means to pick up data from record material; storing means operable to control said auxiliary keys and selectively settable under control of said pick-up means or said differential means; and sequence of operation control means having members selectively operable to control the above means to cause their operation at the proper time during the five machine cycles of an accounting operation, said sequence control means causing the balance totalizer and one of said auxiliary totalizers to be engaged with the differential means to receive entries therefrom under control of the manipulative devices during the first machine cycle of operation and also causing the pick-up means to operate and enter amounts in said storing means, said sequence control means causing the balance totalizer and another auxiliary totalizer to engage the differential means and enabling the auxiliary keys to be controlled by the storing means in the second machine cycle so that amounts picked up in said first machine cycle will be entered in these totalizers in the second machine cycle, said sequence control means controlling the differential means and the engagement of the balance totalizer therewith in the third and fourth machine cycles to clear the amount from the balance totalizer, said sequence control means causing the differential means to set the storing means in the fourth machine cycle in accordance with the amount taken from the balance totalizer and said sequence control means causing said first auxiliary totalizer to engage the differential means in the fifth machine cycle and causing the auxiliary keys to be controlled from said storing means, thus enabling the amount cleared from the balance totalizer to be entered into said first totalizer in said fifth machine cycle.

21. In a machine of the class described adapted to perform accounting operations requiring five continuous machine cycles for each accounting operation, the combination of differentially operable mechanism; manipulative keys for controlling the differential operation of said mechanism; auxiliary keys for controlling the differential operation of said mechanism; pick-up means operating in the first machine cycle of the accounting operation to derive an amount from record material; storage means for storing amounts and controlling the selection of said auxiliary keys according to said amount and controlled by said pick-up means in the first machine cycle and by said differential mechanism during the fourth machine cycle; means for enabling the storage means to select the auxiliary keys in the second and fifth machine cycles so that the selected keys may control the differential mechanism in these machine cycles; a balance totalizer; means for engaging said balance totalizer with said differential mechanism in the first and second machine cycles to enable entries to be made therein in each of these cycles and in the third and fourth machine cycles to enable the amount standing on the balance totalizer to be cleared therefrom; a first auxiliary totalizer; means for engaging said first auxiliary totalizer with the differential mechanism in the first and fifth machine cycles to enable an entry to be made therein in each cycle; a second auxiliary totalizer; and means for engaging said second totalizer with the differential mechanism in the second machine cycle to enable an entry to be made therein, the operation of the above-mentioned means being so correlated that in the first machine cycle, entries are made into the balance totalizer and first auxiliary totalizer by the differential mechanism under control of the manipulative keys and also in this cycle an amount is picked up from record material and entered into said storage means, in the second machine cycle entries are made in the balance totalizer and second auxiliary totalizer by the differential mechanism under control of the storage means controlled auxiliary keys, in the third and fourth machine cycles the balance totalizer is cleared by the differential mechanism of the amount standing therein and this amount is entered into the storage means; and in the fifth machine cycle an entry of the amount cleared from the balance totalizer is made into the first auxiliary totalizer by the differential mechanism under control of the storage means controlled auxiliary keys.

22. In a machine of the class described operable to perform accounting operations during five continuous machine cycles of operation, the combination of recording means; a balance totalizer; auxiliary totalizers; differential means to enter and withdraw amounts from any of the totalizers and set amounts in said recording means; means to operate said recording means to make a record of said amounts; means for selectively engaging the balance totalizer and the auxiliary totalizers with the differential means; manipulative keys to control said differential means; auxiliary keys to control said differential means; means to pick up data from record material; storing means operable to control said auxiliary keys and selectively settable under control of said pick-up means or said differential means; and sequence of operation control means having members selectively operable to control the above means to cause their operation at the proper time during the five machine cycles of an accounting operation, said sequence control means causing the balance totalizer and one of said auxiliary totalizers to be engaged with the differential means to receive entries therefrom under control of the manipulative devices and causing the recording means to operate and make a record of the entry during the first machine cycle of operation and also causing the pick-up means to operate and enter amounts in said storing means, said sequence control means causing the balance totalizer and another auxiliary totalizer to engage the differential means, enabling the auxiliary keys to be controlled by the storing means in the second machine cycle so that amounts picked up in said first machine cycle will be entered in these totalizers in the second machine cycle and causing said recording means to operate and make a record of the picked-up amount, said sequence control means controlling the differential means and the engagement of the balance totalizer therewith in the third and fourth machine cycles to clear the amount from the balance totalizer, said sequence control means causing the differential means to set the storing means in the fourth machine cycle in accordance with the amount taken from the balance totalizer and causing the recording means to operate and record said amount, and said sequence control means causing said first auxiliary totalizer to engage the differential means in the fifth machine cycle and causing the auxiliary keys to be controlled from said storing means thus enabling the amount cleared from the balance totalizer to be entered into said first totalizer in said fifth machine cycle.

23. In a machine of the class described operable to perform accounting operations during a plurality of continuous machine cycles of operation, the combination of recording means; a balance totalizer; differential means to enter and withdraw amounts from said balance totalizer and to set amounts in said recording means; means to operate said recording means to make a record of said amounts; means for selectively engaging the balance totalizer with the differential means; manipulative keys to control said differential means; auxiliary keys to control said differential means; means to pick up data from record material; storing means operable to control said auxiliary keys and settable under control of said pick-up means or said differential means; and sequence of operation control means having members selectively operable to control the above means to cause their operation at the proper time during the plurality of machine cycles of an accounting operation, said sequence control means causing the balance totalizer to be engaged with the differential means to receive an entry therefrom under control of the manipulative devices and causing the recording means to operate and make a record of the entry during the first machine cycle of the accounting operation and also causing the pick-up means to operate and enter amounts in said storing means, said sequence control means causing the balance totalizer to engage the differential means, enabling the auxiliary keys to be controlled by the storing means in the second machine cycle of the accounting operation so that amounts picked up in said first machine cycle will be entered in the balance totalizer in the second machine cycle and causing said recording means to operate and make a record of the picked-up amount, said sequence control means controlling the differential means and the engagement of the balance totalizer therewith in the third and fourth machine cycles to clear the amount from the balance totalizer, and said sequence control means causing the recording means to operate and record said amount in said fourth machine cycle of the accounting operation.

24. In a machine of the class described, the combination of members differentially operable according to digit values; coexisting selectively operable alternative means for controlling the differential operation of said members according to selected digit values, one of said alternative control means being manually operable according to a direct digit value representation; translating means comprising a plurality of members separately settable according to combinational encoded representations of digit values and having means thereon jointly operable to control the selective operation of the other of the alternative control means according to digit values; and means for setting combinational encoded representations of digit values in said translating means, said alternative control means enabling the differential members to be controlled selectively by direct and by encoded representations of digit values.

25. In a machine of the class described adapted to be controlled according to direct and combinational representations of digit values, the combination of a plurality of denominational key banks, each having a plurality of manipulative digit keys and a plurality of auxiliary digit keys; a differentially operable mechanism associated with each key bank and cooperable with either the manipulative keys or the auxiliary keys for control thereby; translating means contained in each key bank, operable according to combinational representations of digit values, and cooperable with the auxiliary digit keys whereby an auxiliary digit key may be selected for operation; and means for operating said translating means according to combinational representations of digit values, said dual control by the key banks enabling the differentially operable mechanisms to be operated according to direct digital representation or combinational digit representation.

26. In a machine of the class described, the combination of a first totalizer; a second totalizer; differential means for entering or withdrawing amounts into or from either of the totalizers; a plurality of digit keys for controlling the operation of the differential means to enter amounts in said totalizers; amount storage means cooperable with said keys to select keys for operation corresponding to the stored amount; means controlled by said differential means for setting amounts in said storage means; control means for controlling the operation of one of the totalizers, the differential means, and the storage means setting means to withdraw an amount from said one totalizer and set it in said storage means in one operation of the machine; and further control means operable in the next succeeding operation of the machine to control the operation of the other totalizer, and to enable the keys selected by the storage means to control the operation of the differential means to cause the amount cleared from said one totalizer to be entered into said other totalizer.

27. In a machine of the class described, the combination of a plurality of denominational key banks, each having a plurality of manipulative digit keys and a plurality of auxiliary digit keys; a differential mechanism associated with each key bank and cooperable with either the manipulative keys or the auxiliary keys for control thereby according to digit values; storage means contained in each key bank, settable according to digit values and cooperable with the auxiliary digit keys to select the digit key for operation which corresponds to the value in the storage means; means operated by the differential mechanisms, when they are operated, for causing the setting of the storage means according to the values represented by the operated differential mechanisms; and control means to enable the auxiliary keys to be selected by the storage means to control the differential mechanisms to cause the differential mechanisms to operate in a subsequent operation the same extents as in a preceding operation.

GUNNAR NELSON.